(12) United States Patent
Jin et al.

(10) Patent No.: US 9,815,523 B2
(45) Date of Patent: Nov. 14, 2017

(54) FOLDABLE CANOE

(71) Applicant: MY CANOE CO., LTD., Gwangju (KR)

(72) Inventors: Kwang Suk Jin, Yongin (KR); Kyung Il Jung, Pocheon (KR)

( * ) Notice: Subject to any disclaimer, the term of this patent is extended or adjusted under 35 U.S.C. 154(b) by 0 days.

(21) Appl. No.: 14/787,015

(22) PCT Filed: Nov. 19, 2014

(86) PCT No.: PCT/KR2014/011115
§ 371 (c)(1),
(2) Date: Oct. 26, 2015

(87) PCT Pub. No.: WO2015/080423
PCT Pub. Date: Jun. 4, 2015

(65) Prior Publication Data
US 2016/0257378 A1 Sep. 8, 2016

(30) Foreign Application Priority Data
Nov. 28, 2013 (KR) .......................... 10-2013-0145980

(51) Int. Cl.
*B63B 7/00* (2006.01)
*B63B 35/71* (2006.01)
*B63B 7/02* (2006.01)
*B63B 7/06* (2006.01)
*B63B 5/24* (2006.01)

(52) U.S. Cl.
CPC ................. *B63B 7/02* (2013.01); *B63B 5/24* (2013.01); *B63B 7/00* (2013.01); *B63B 7/06* (2013.01); *B63B 35/71* (2013.01); *B63B 2007/003* (2013.01); *Y02T 70/143* (2013.01)

(58) Field of Classification Search
CPC ................ B63B 2007/003; B63B 7/00; B63B 2007/006; B63B 7/02; B63B 7/04; B63B 7/06; B63B 35/71
See application file for complete search history.

(56) References Cited

U.S. PATENT DOCUMENTS

| | | | |
|---|---|---|---|
| 2,880,429 A * | 4/1959 | Henry | ........................ B63B 7/06 114/353 |
| 7,568,444 B2 | 8/2009 | Espeseth | |
| 8,316,788 B2 * | 11/2012 | Willis | ..................... B63B 35/71 114/347 |
| 2012/0073491 A1 | 3/2012 | Signorini | |
| 2013/0233234 A1 | 9/2013 | Crumpton | |

FOREIGN PATENT DOCUMENTS

EP 0115856 A2 * 8/1984 ............... B63B 7/06

* cited by examiner

*Primary Examiner* — Andrew Polay
(74) *Attorney, Agent, or Firm* — Matthew M. Googe; Robinson IP Law, PLLC

(57) ABSTRACT

Disclosed herein is a foldable canoe. More particularly, the foldable canoe is configured such that it is constructed by folding a single synthetic resin sheet along a folding line without using a separate structural frame, and after the use of the canoe, the synthetic resin sheet can be completely folded along the folding line to form a compact shape, thus reducing the volume and length of the canoe, thereby facilitating transportation and storage of the canoe.

8 Claims, 24 Drawing Sheets

[Fig. 1]
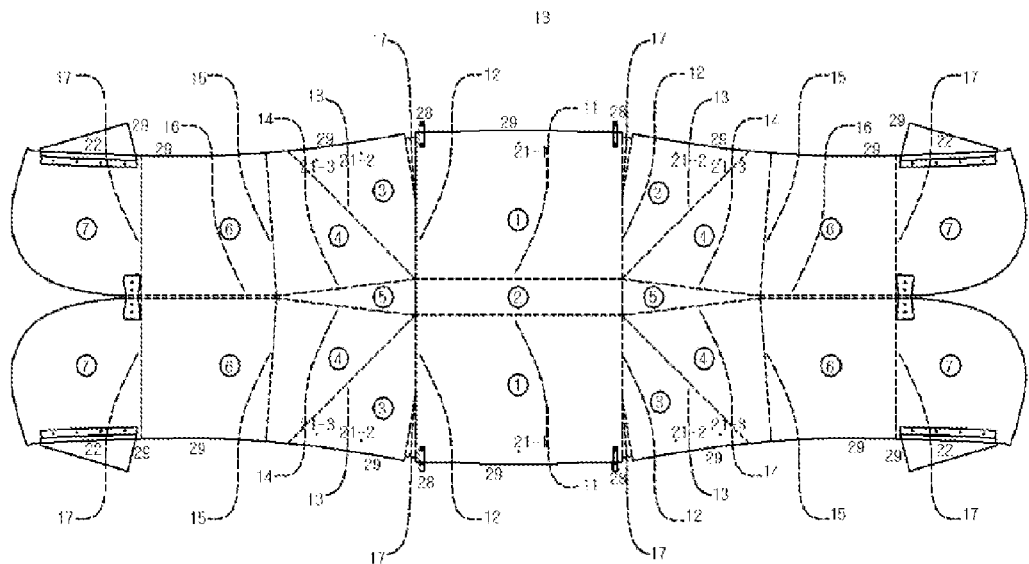
[Fig. 2]
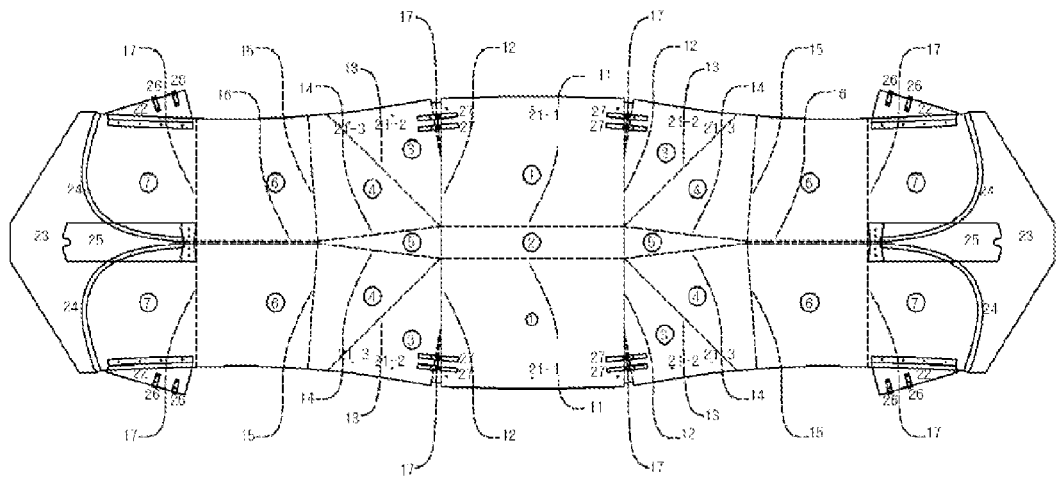
[Fig. 3]
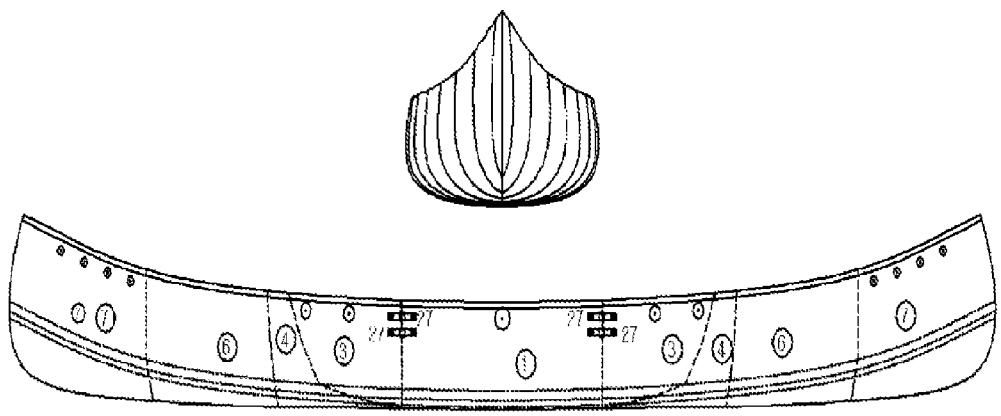

[Fig. 4]
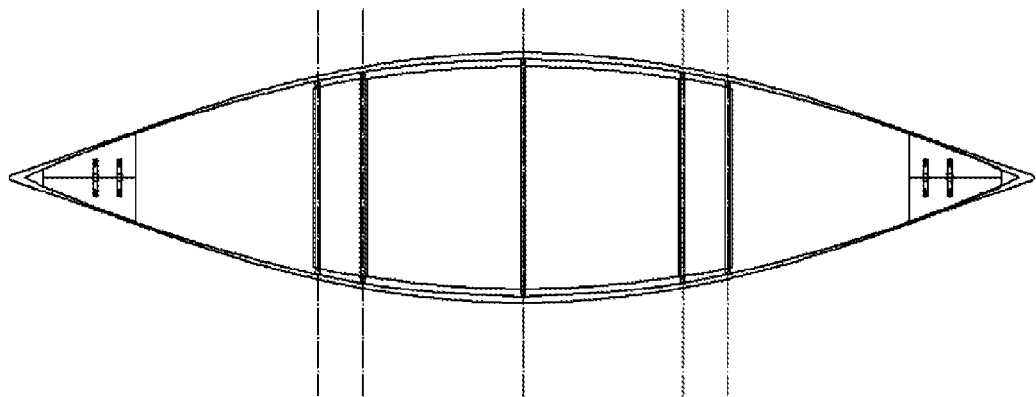
[Fig. 5]
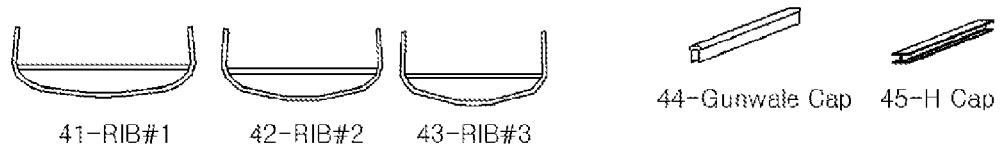
41-RIB#1    42-RIB#2    43-RIB#3    44-Gunwale Cap    45-H Cap
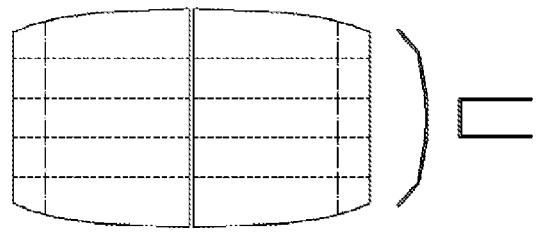
46-Floor Board
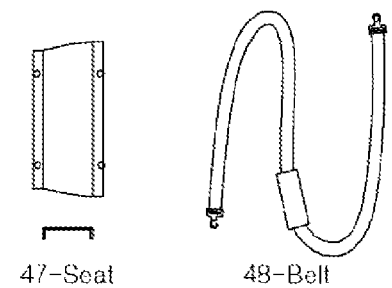
47-Seat    48-Belt
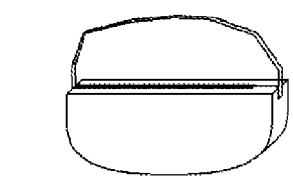
49-Bag

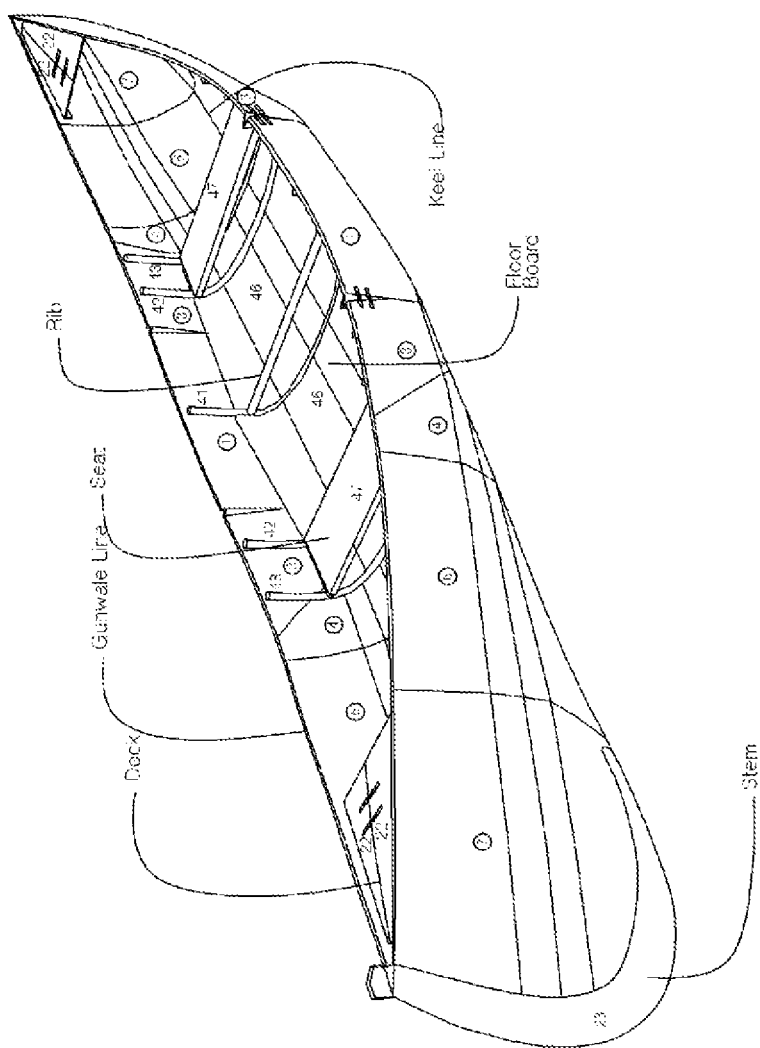
[Fig. 6]

[Fig. 7]
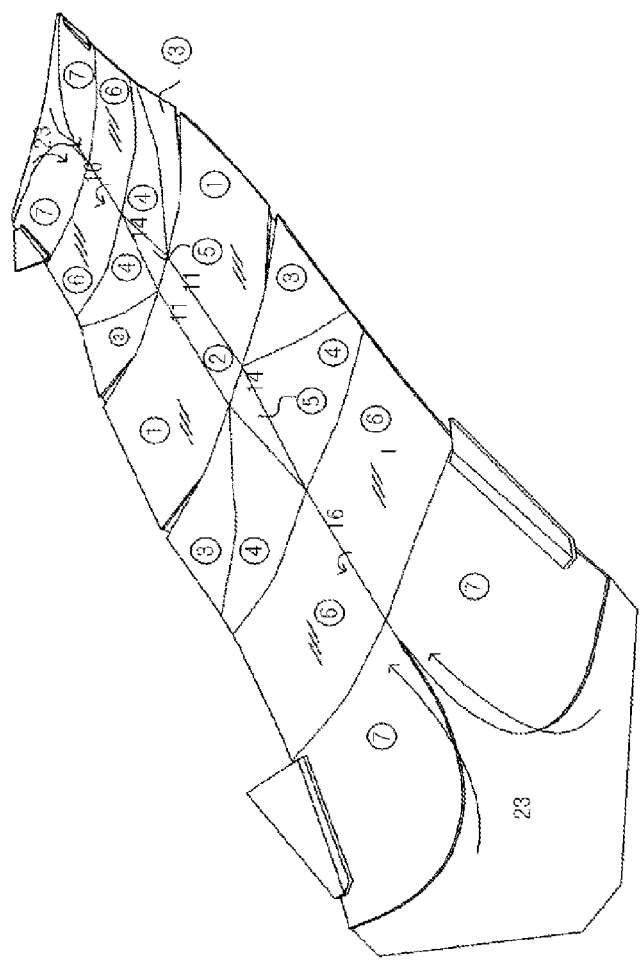
[Fig. 8]
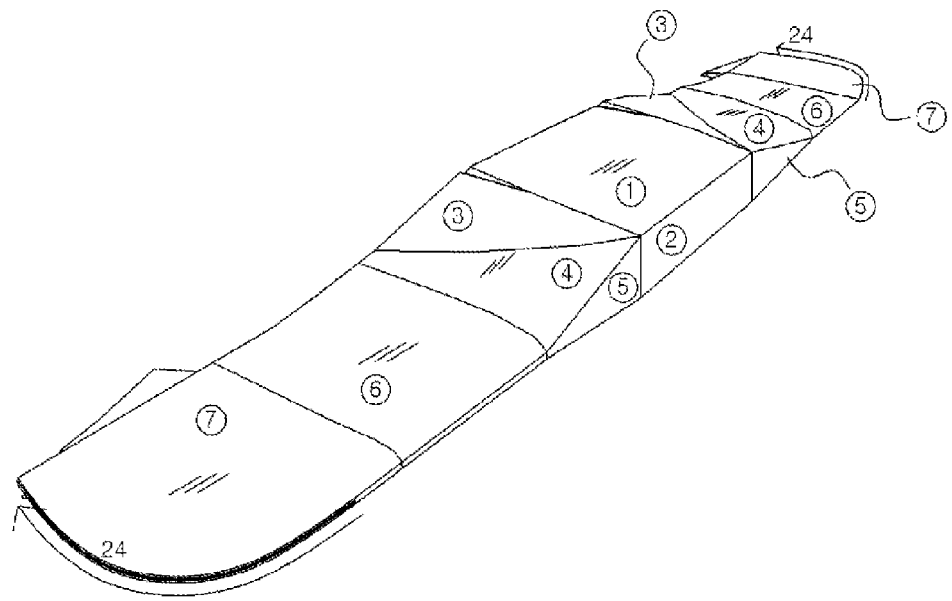

[Fig. 9]
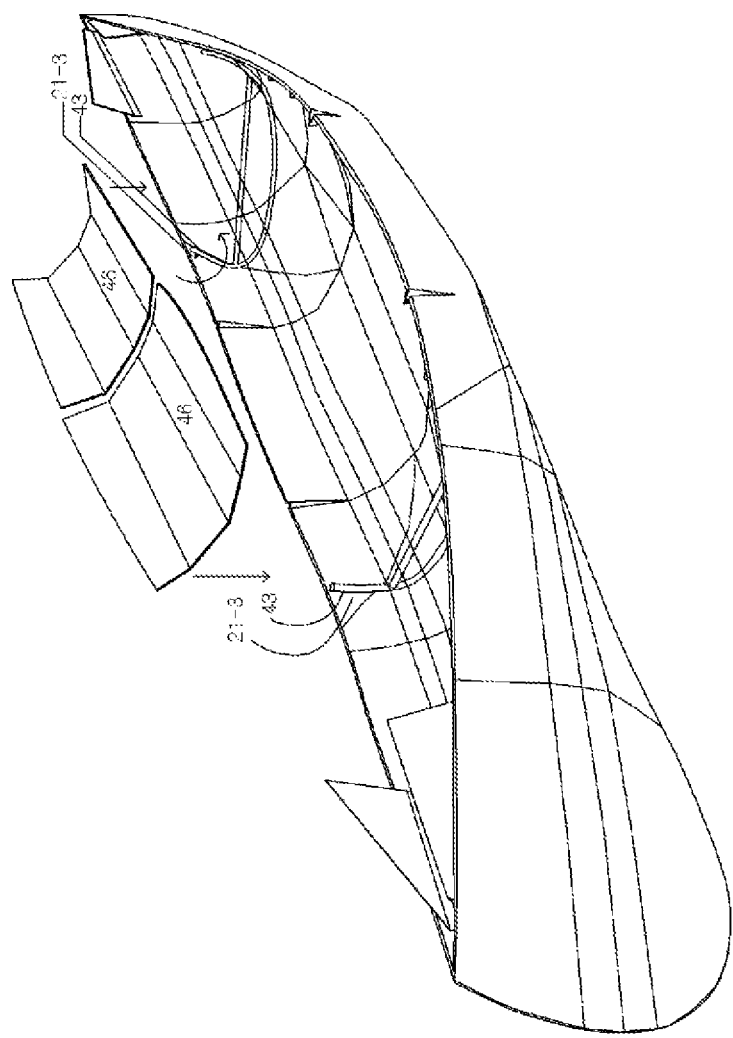
[Fig. 10]
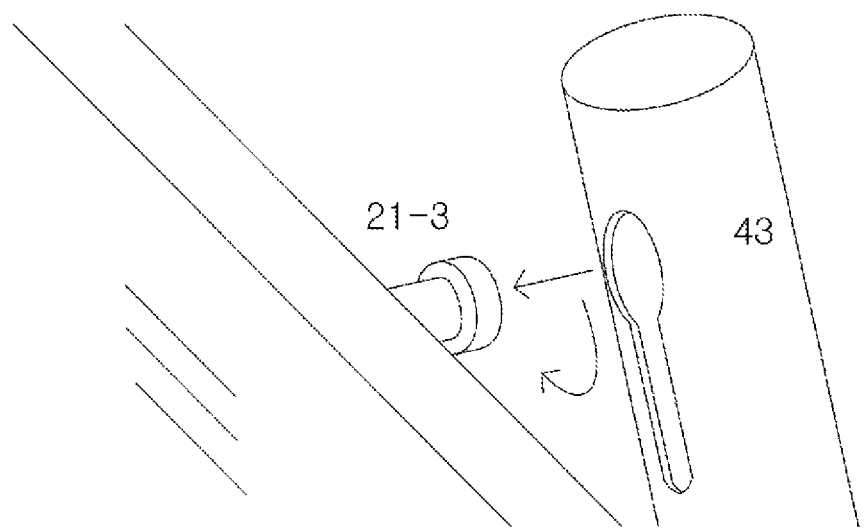

[Fig. 11]
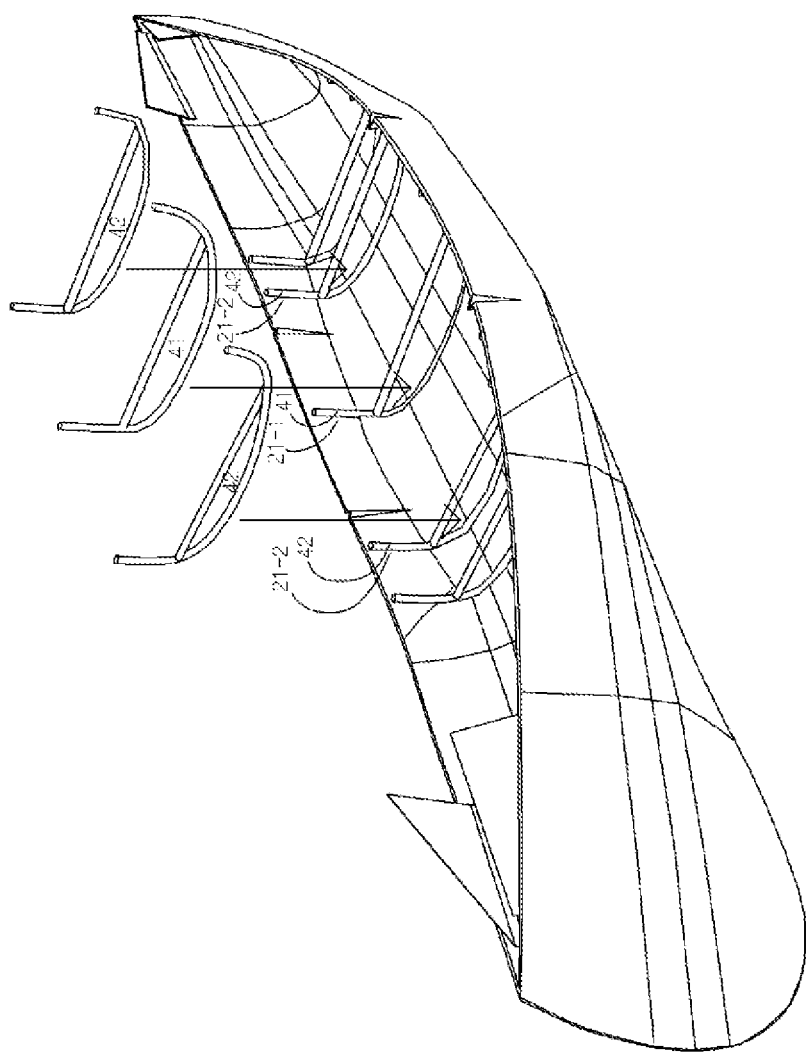

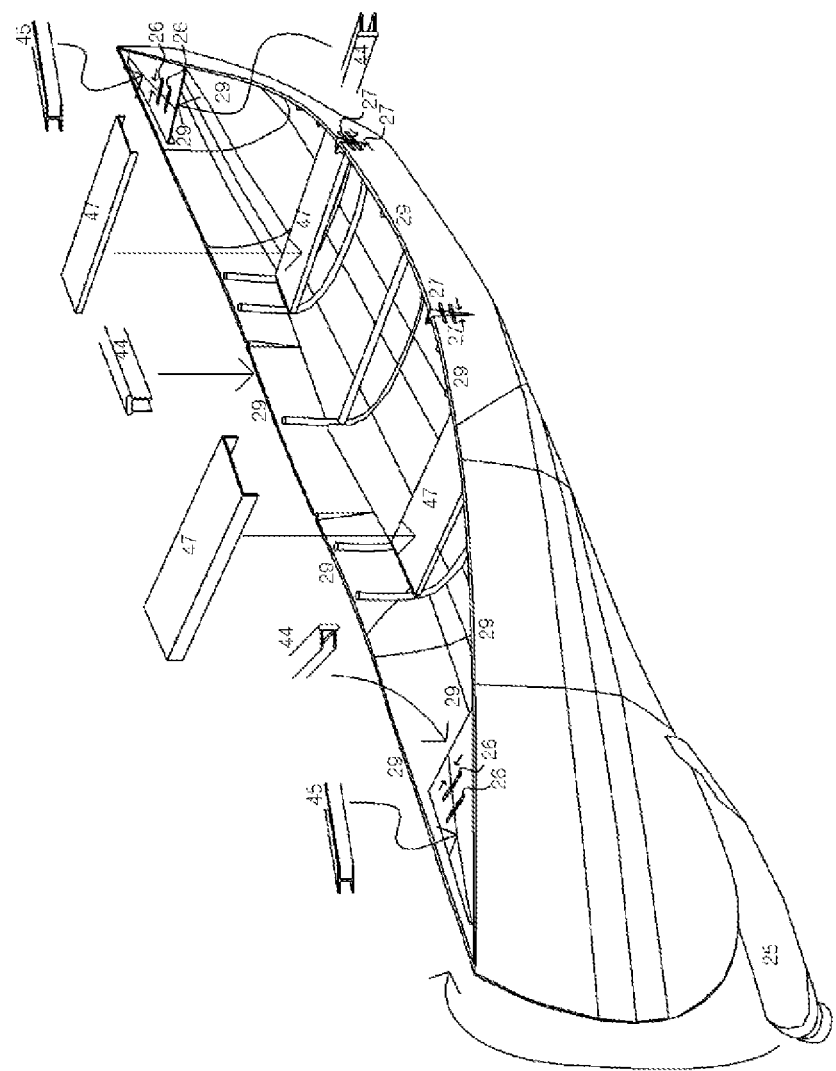
[Fig. 12]

[Fig. 13]
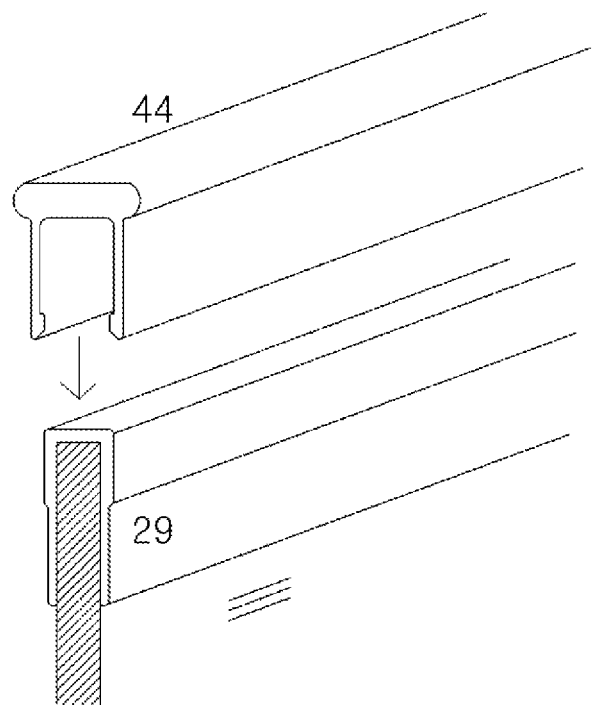
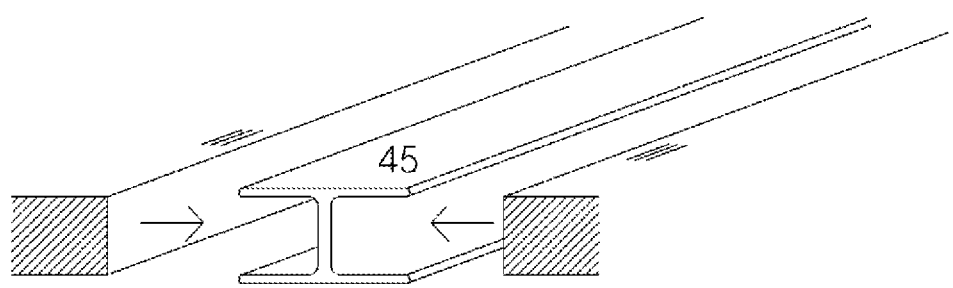

[Fig. 14]
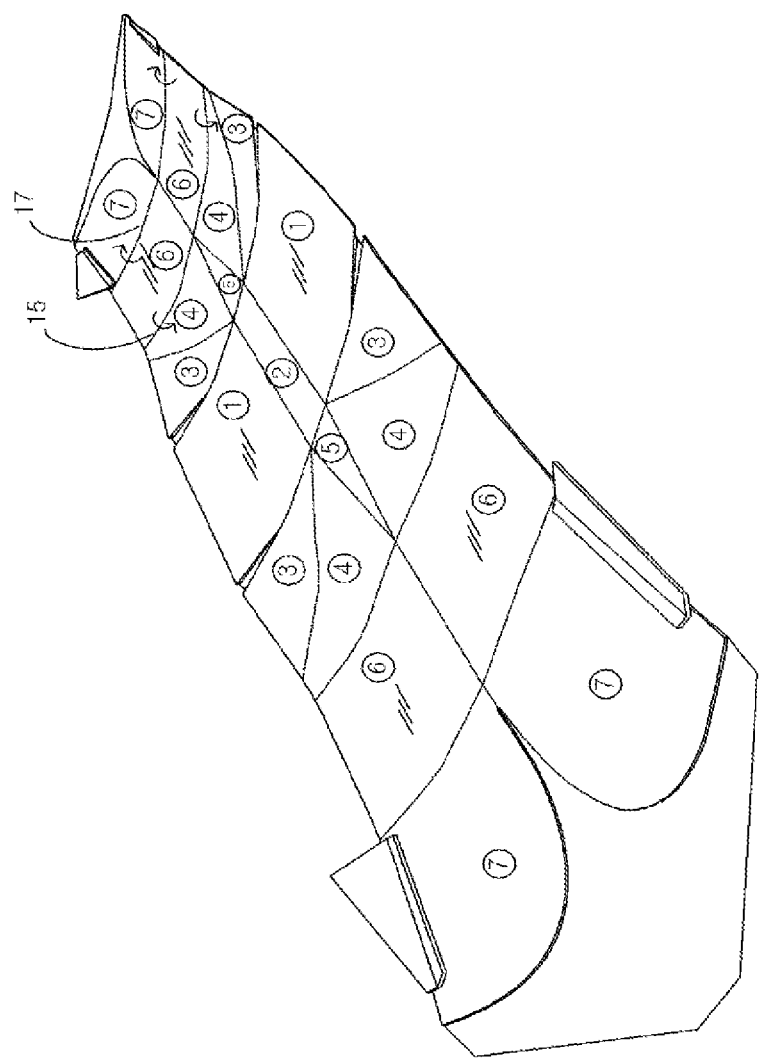

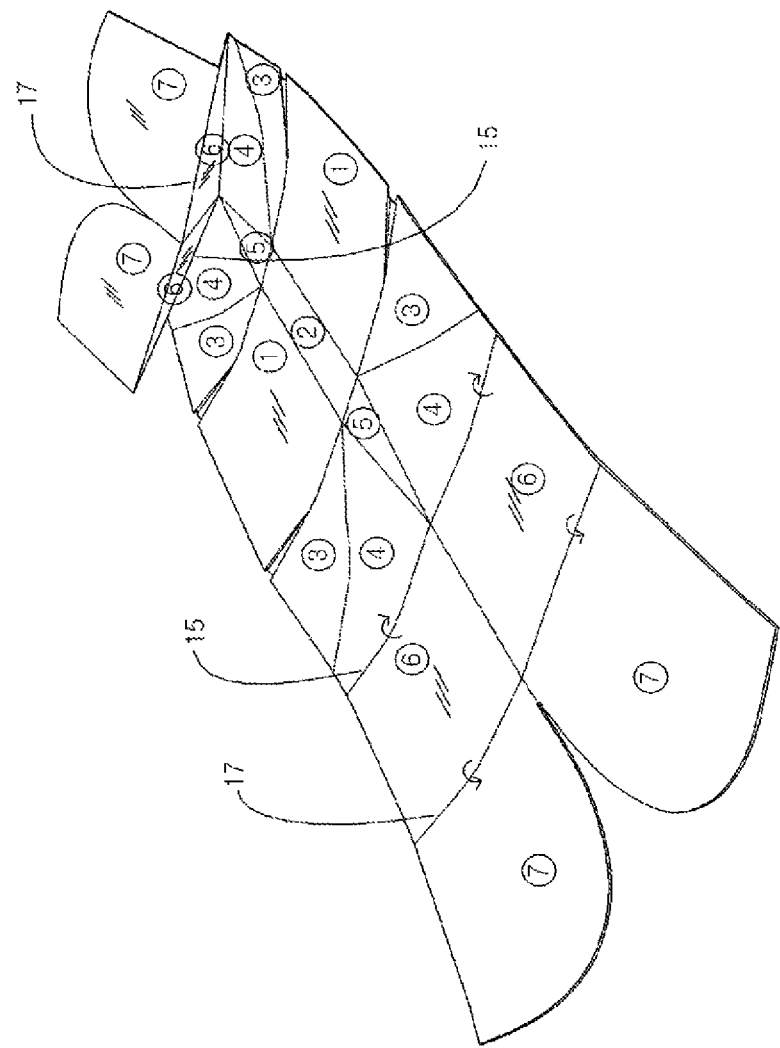
[Fig. 15]

[Fig. 16]
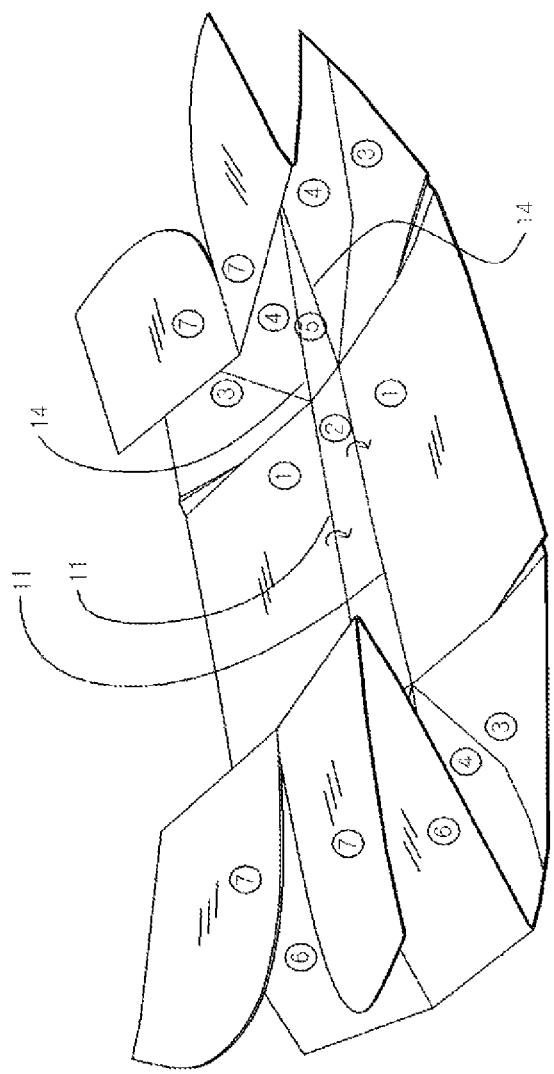

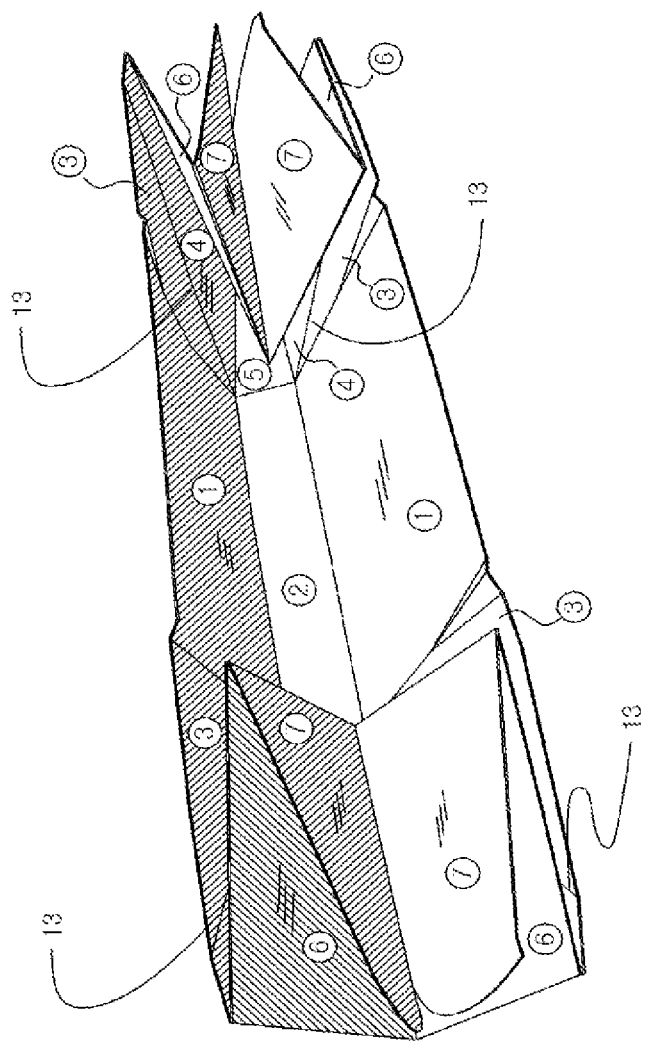
[Fig. 17]

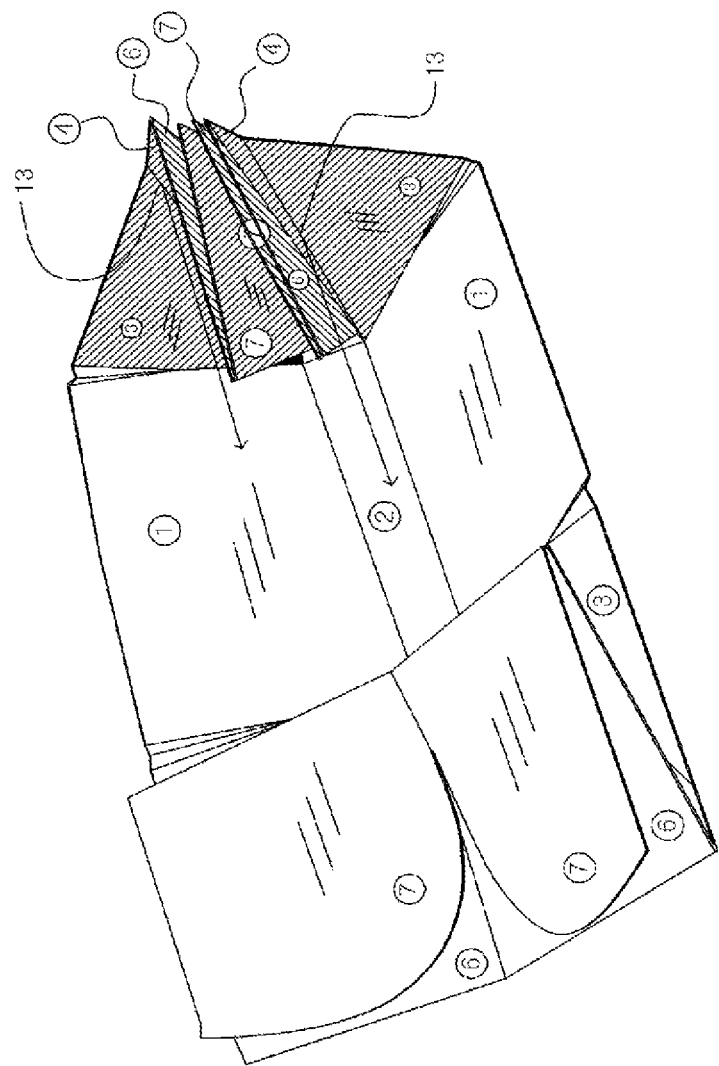
[Fig. 18]

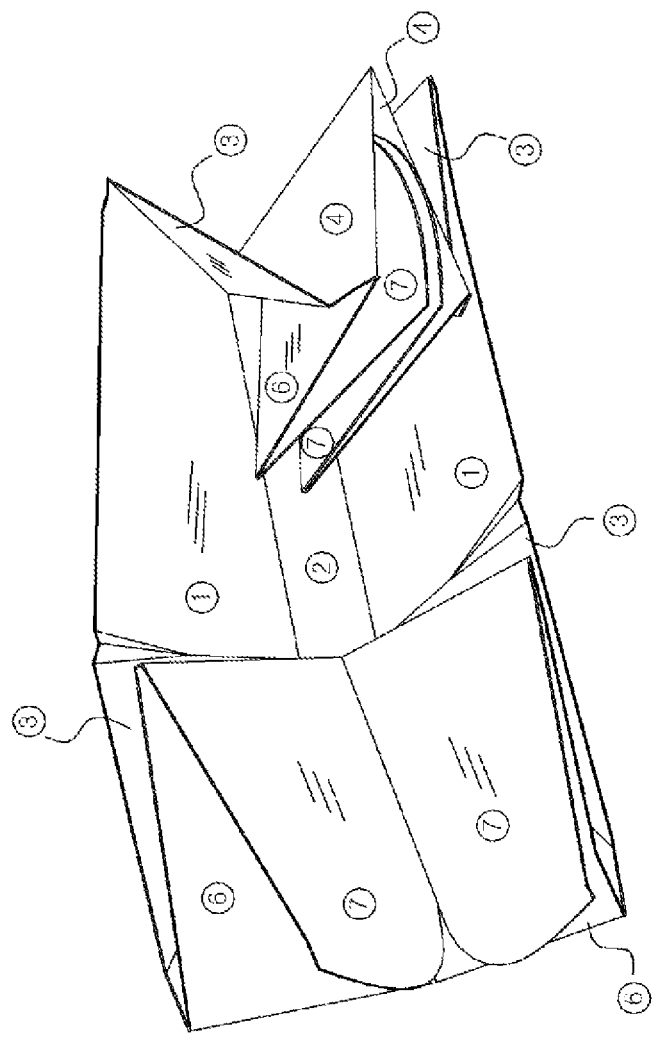
[Fig. 19]

[Fig. 20]
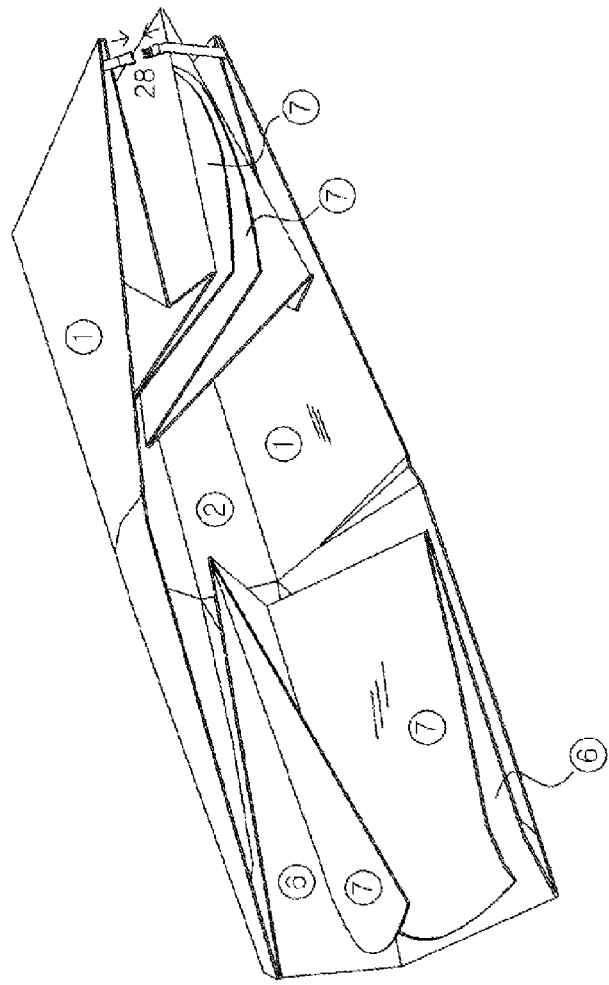
[Fig. 21]
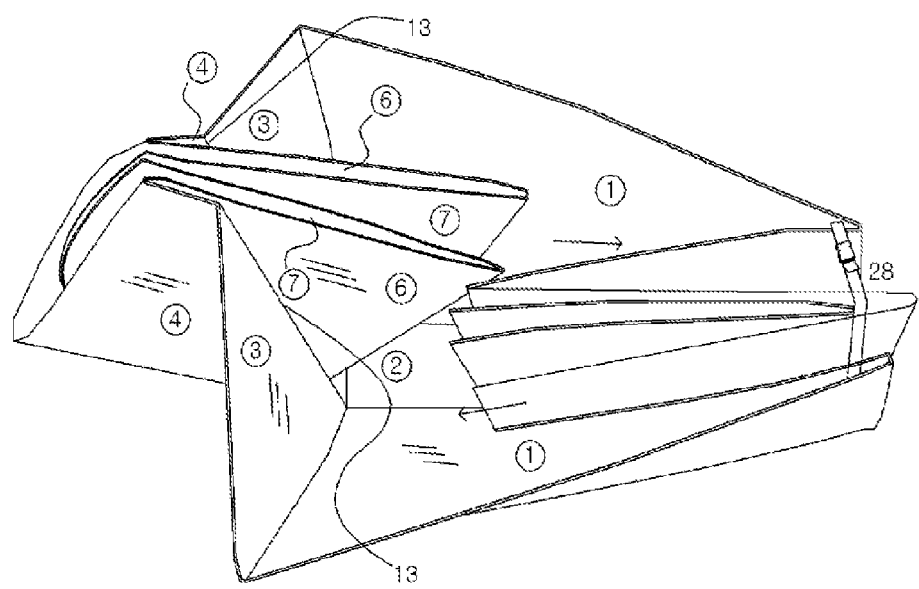

[Fig. 22]
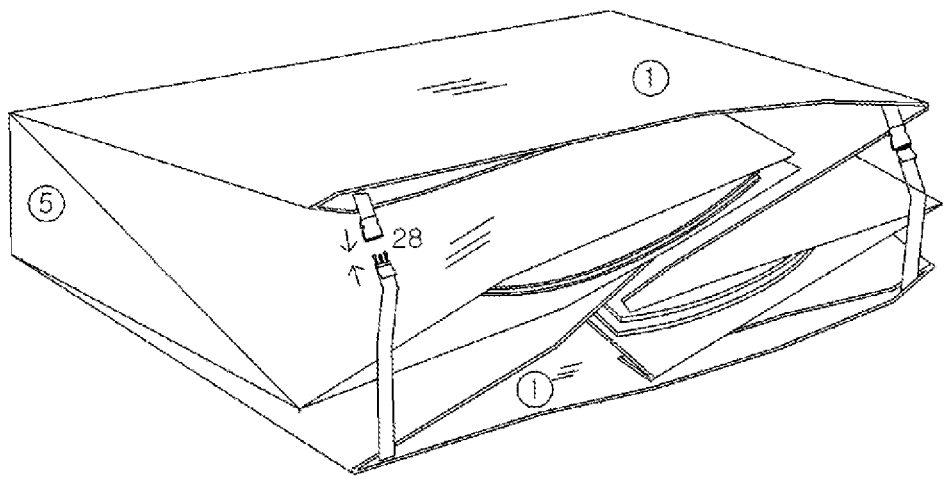

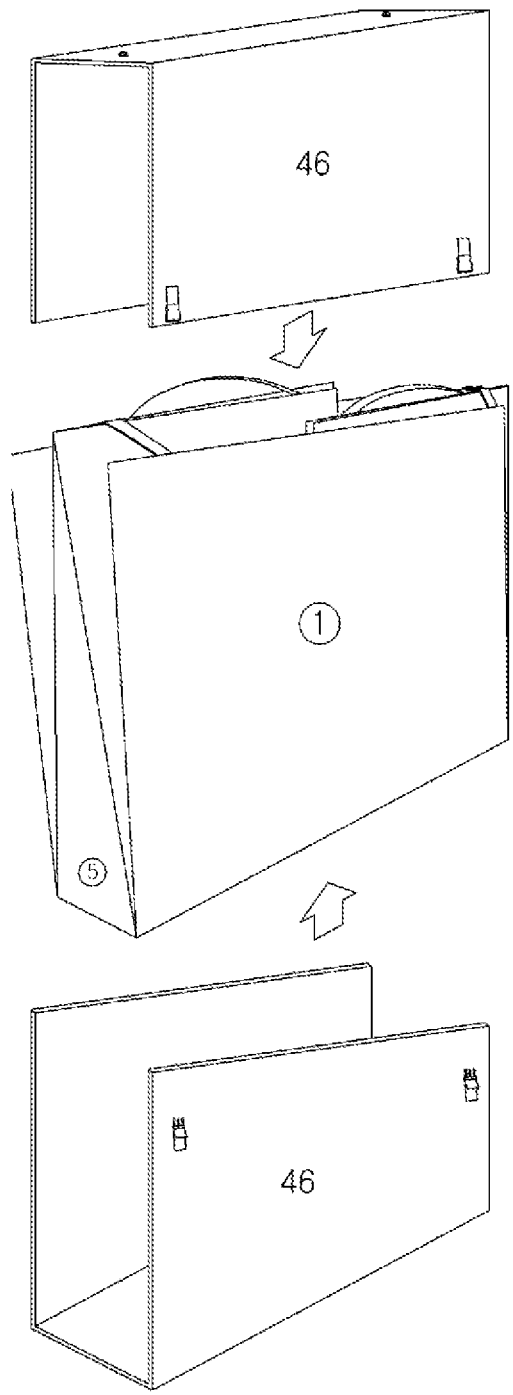
[Fig. 23]

[Fig. 24]
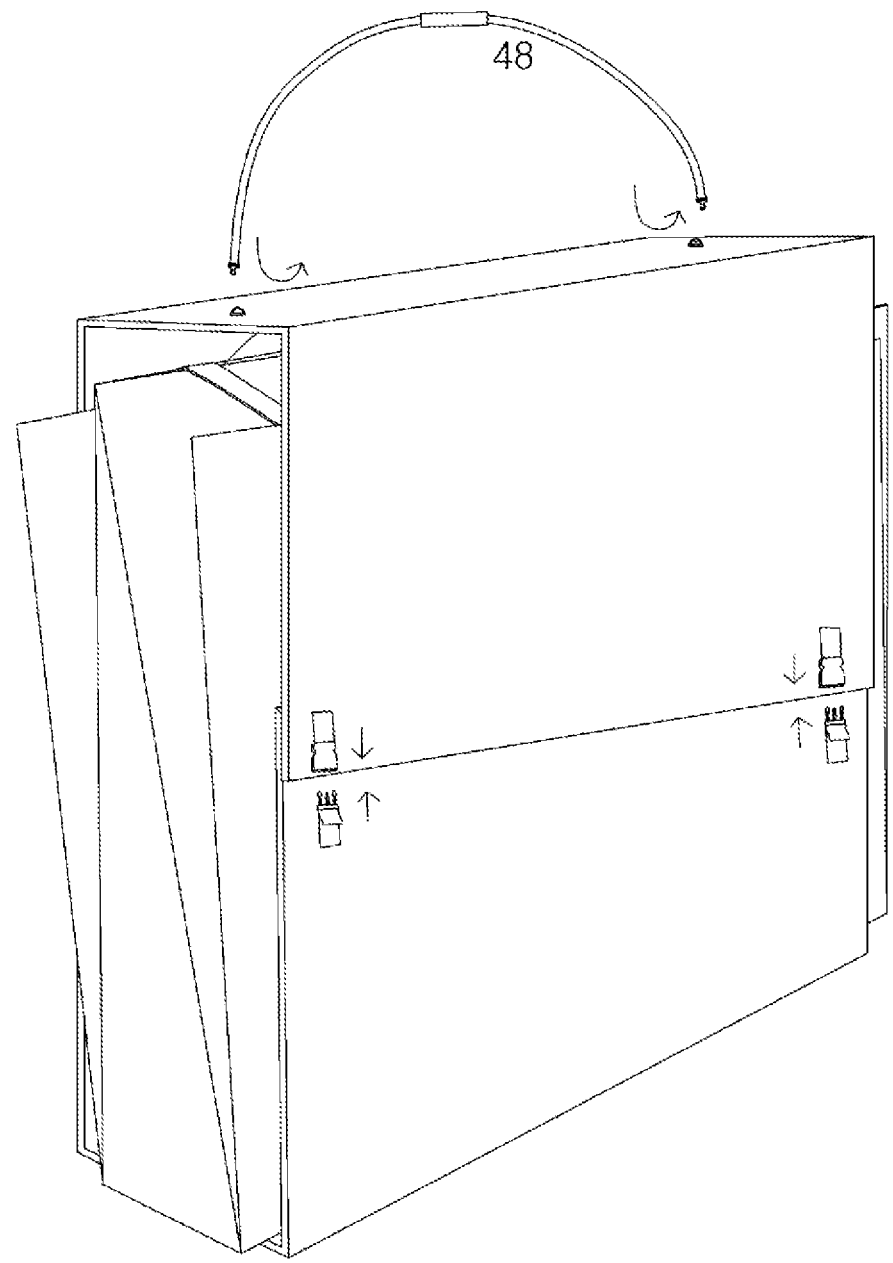

[Fig. 25]
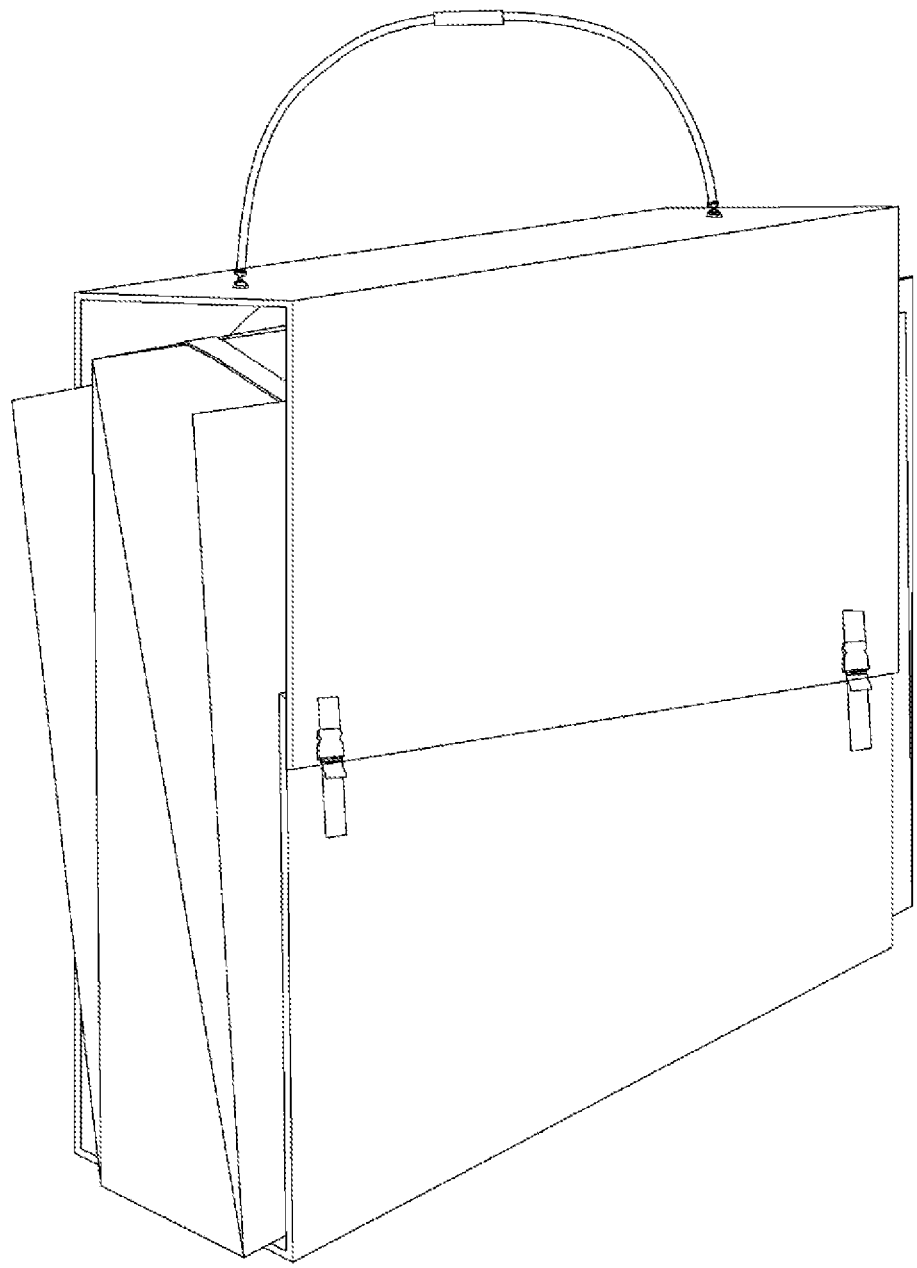

[Fig. 26]
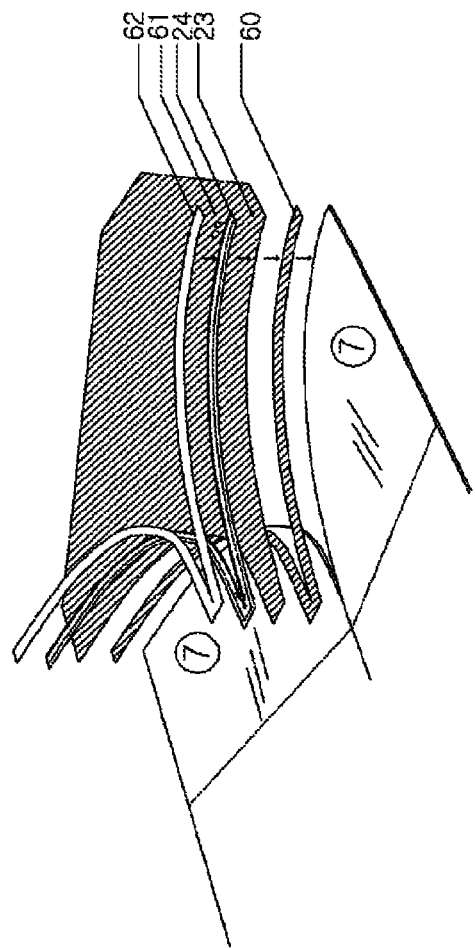
[Fig. 27]
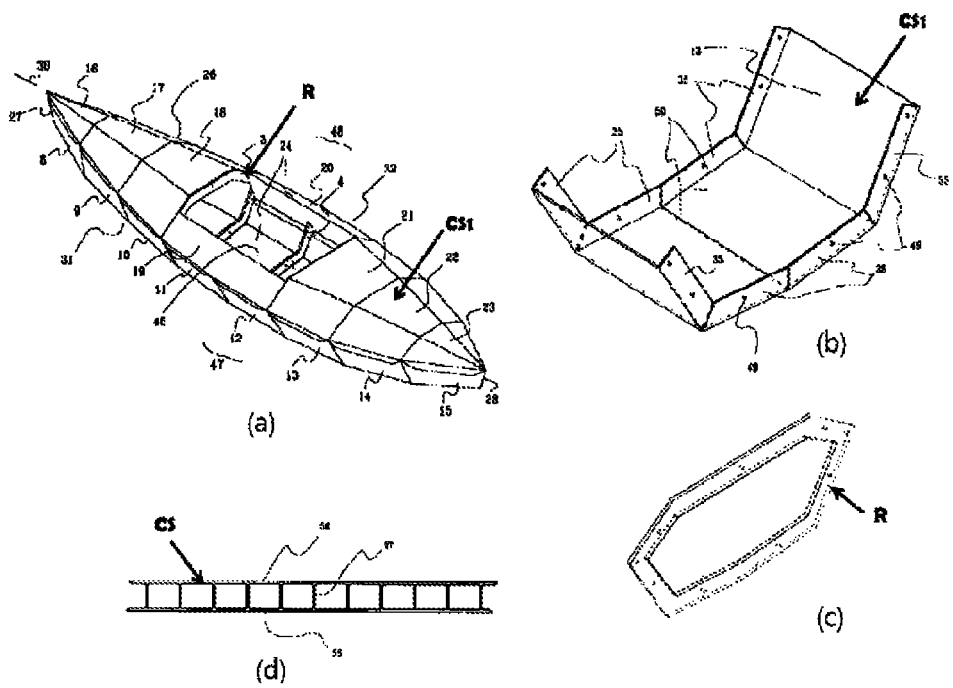

[Fig. 28]
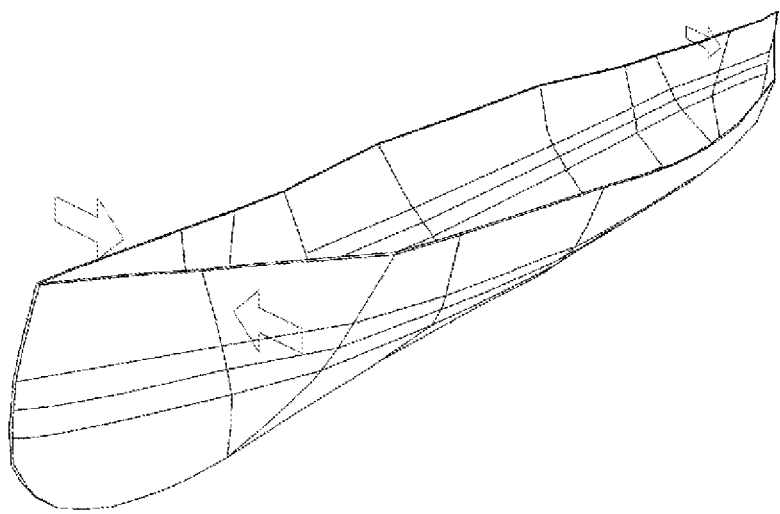
[Fig. 29]
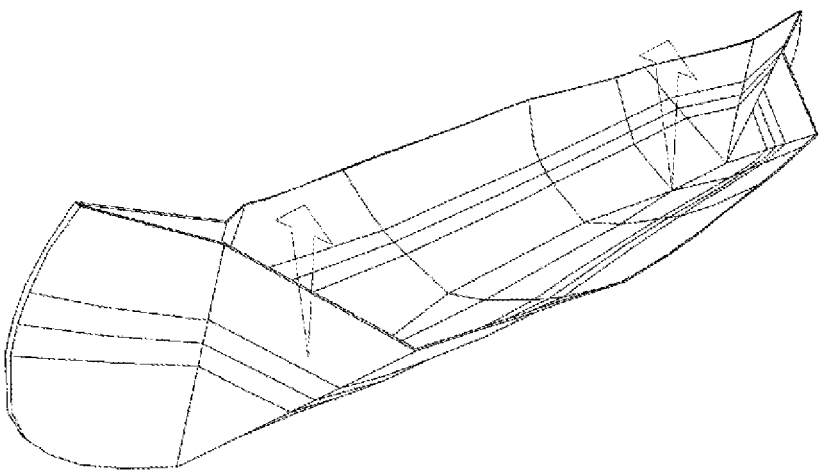
[Fig. 30]
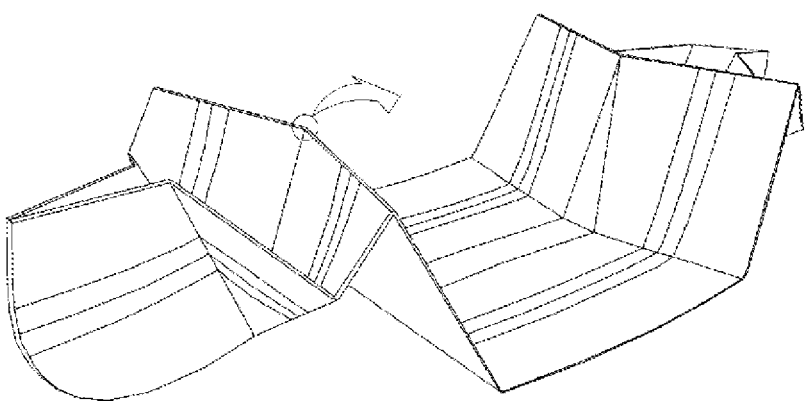

[Fig. 31]
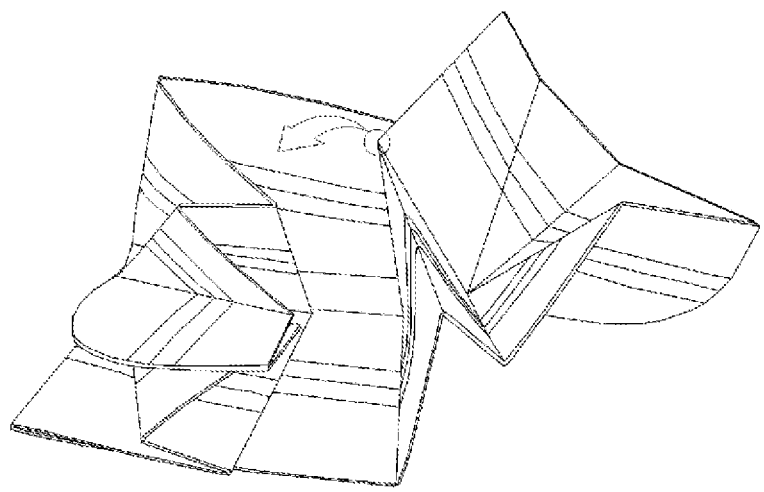
[Fig. 32]
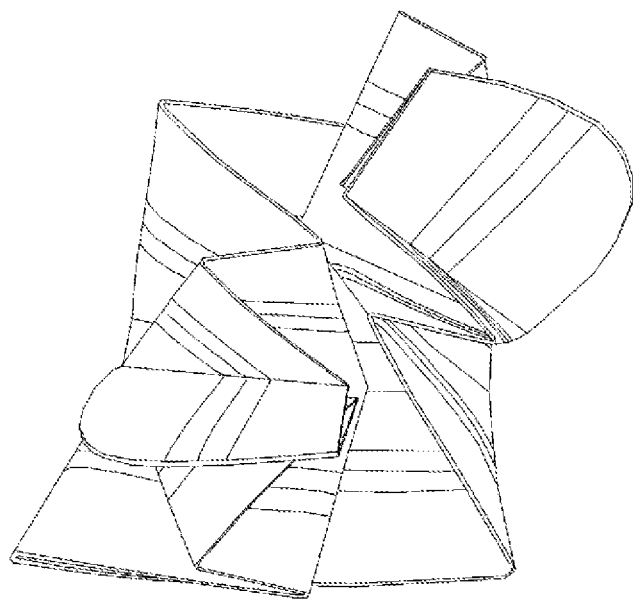
[Fig. 33]
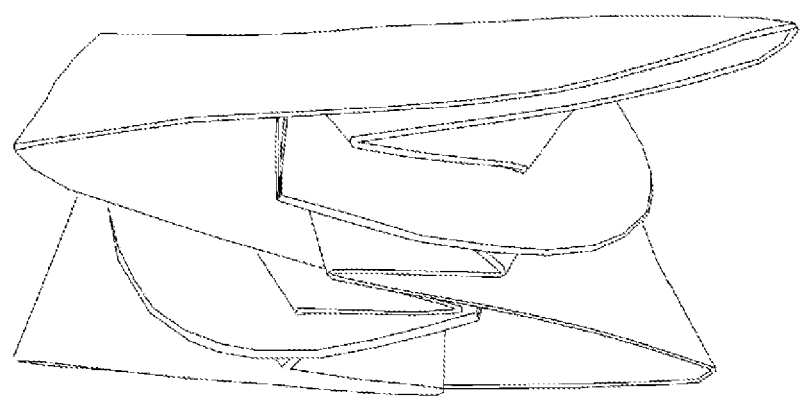

[Fig. 34]
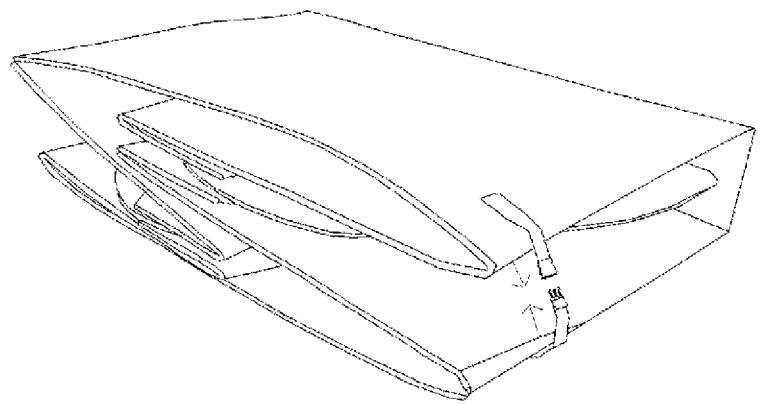
[Fig. 35]
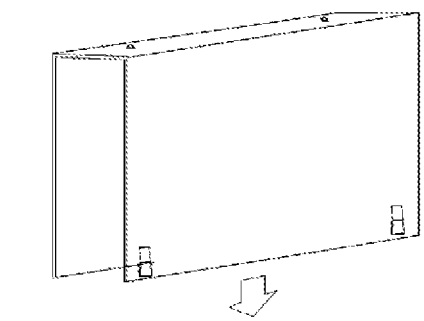
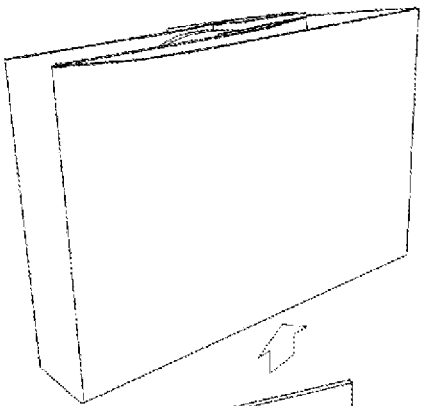
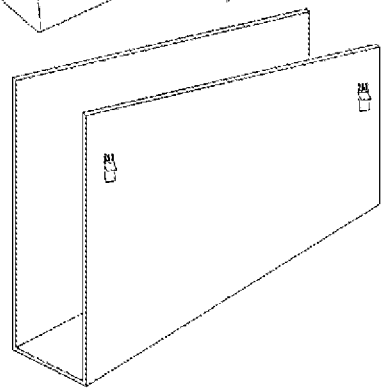

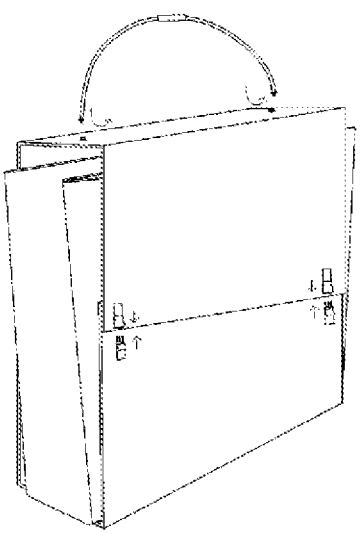
[Fig. 36]

FOLDABLE CANOE

TECHNICAL FIELD

The present invention generally relates to foldable canoes. More particularly, the present invention relates to a foldable canoe that is configured such that it is constructed by folding a single synthetic resin sheet along a folding line without using a separate structural frame, and after the use of the canoe, the synthetic resin sheet can be completely folded along the folding line to form a compact shape, thus reducing the volume and length of the canoe, thereby facilitating transportation and storage of the canoe.

BACKGROUND ART

Recently, there has been an increase in the number of people who enjoy using high performance personal light boats, for example, personal non-powered boats that are manually propelled by paddling. In particular, kayaks, which are designed to be used in strong currents of valley or on white water rapids, are a traditional type of boat used in extreme water sports that are popular with young adventure and thrill seekers. Furthermore, even if not used in strong currents or on white water rapids, kayaks or canoes can be used as personal water leisure means that enable a user to move far into a calm river or lake or cross bodies of water and enjoy fishing or hunting.

Typically, conventional personal small non-powered boats such as kayaks or canoes are made of thermoformed plastics or glass fiber reinforced plastics (FRP) to form hard hulls or are manufactured by integrally fitting panels made of a hard material such as wood or plywood. Therefore, conventional boats are advantageous in that their safety (durability, water resistance, impact resistance) in water, the strength, and use convenience (control performance, directivity, speed, etc.) resulting from the high stability are excellent. However, such a conventional boat is problematic in that the boat is heavy and production cost thereof is high. In addition, even though the boat is satisfactorily designed such that it can be effectively operated on water, it is difficult to transport the boat to water and store it when not used because of a large size.

Technical efforts to overcome the above problems are classified into the following three categories.

First, as a representative effort that has been widely used before, a boat having a separable structure was proposed. In detail, a frame of a kayak or canoe body includes a plurality of elements (boards, wires, etc. made of wood, metal or synthetic resin or the like) that can be separably assembled with each other by fasteners or connectors. Furthermore, a separate flexible waterproof hull covers the assembled frame. Such a structure for boats is called a skin on frame structure.

Conventional techniques pertaining to this category were in U.S. Pat. No. 4,274,170 (title: COLLAPSIBLE KAYAK, 1981) invented by Douglass E. Simpson, U.S. Pat. No. 4,702,193 (title: COLLAPSIBLE BOAT, 1987) invented in common by Michael P. Jones and Paul M. Hahn, U.S. Pat. No. 4,841,899 (title: FOLDING KAYAK, 1989) invented in common by Logan N. Fleckles and Karen Fleckles, U.S. Pat. No. 5,680,828 (title: KAYAK, 1997) invented by Joseph J. Totten, U.S. Pat. No. 5,875,731 (title: COLLAPSIBLE BOAT, 1999) invented in common by Logan N. Fleckles and Karen Fleckles, U.S. Pat. No. 5,680,828 (title: KAYAK, 1997) invented by Joseph J. Totten, U.S. Pat. No. 5,964,964 (title: COLLAPSIBLE BOAT WITH ENHANCED RIGIDITY AND MULTIFUNCTION CHAIR, 1999) invented by Raymond M. Gonda, and U.S. Pat. No. 6,367,405 (title: FOLDING BOAT, 2002) invented by Gregory W. Simkey.

Such conventional personal boats pertaining to the first category include a hull that is made of flexible waterproof material and is removably coupled to a separably assembled frame to cover the frame. Thus, compared to traditional integrated boats, these conventional personal boats are advantageous in that transportation and storage thereof are facilitated. However, in the case of most of these conventional personal boats, the number and kind of elements constituting a frame are excessively increased, and the assembly structure of the frame is complex. In addition, configurations of connectors or the like for connecting the elements of the frame to each other are complex. It takes a comparatively long time to assemble or disassemble the frame, and there is a need for separate tools. Furthermore, since the hard frame and the flexible hull are made of different materials, the coupling (integration) therebetween is incomplete. Moreover, portions of the hull to which water pressure is applied are curved toward the interior of the boat because the strength of the hull is lower than that of the frame. The curved portions increase frictional resistance to water, thus reducing the performance of the boat in water. Furthermore, the curved portions reduce the strength of the hull, so that the hull may be easily torn when it collides with a sharp rock or the like.

Techniques pertaining to a second category refer to inflatable boats, which are shaped by injection of air. A representative example pertaining to this category was proposed in U.S. Pat. No. 6,065,421 (title: INFLATABLE KAYAK, 2000) invented in common by Clayton Forbes Haller and Charles Prior Hall.

In this technique, the kayak can be markedly reduced in volume and length when it is stored. The basic weight of the kayak can be also reduced. Furthermore, the kayak is designed such that it is easy to inject or discharge air into or from the kayak body. However, since the external shape of the boat is formed by injecting air thereinto, it is difficult to make not only a bow part of the boat but also a stem part be sharp and streamlined. Thus, water resistance applied to the boat is increased, whereby the basic performance of the boat is reduced. Given this, studies on this technique are not actively being conducted.

Techniques pertaining to a second category refer to techniques of: assembling body panels with each other using fasteners to form a boat without using a separate frame for the boat; forming a boat body by means of folding one piece of panel with a film-shaped retainer used to retain the shape of the boat formed by folding the panel; or forming a boat by means of folding a single thin hard panel having a predetermined flexibility, i.e., a light and high-strength synthetic resin corrugated sheet, which will be described in detail later herein, in a similar manner to that of paper folding.

Techniques pertaining to this third category were proposed in U.S. Pat. No. 4,574,725 (title: COLLASIBLE BOAT, 1986) invented by Dennis Dowd, U.S. Pat. No. 4,706,597 (title: SEAMLESS FOLDABLE BOAT, 1987) invented by Frank M. Fl gone, U.S. Pat. No. 4,911,095 (title: COLLAPSIBLE BOAT WITH REMOVABLE TRANSOM PANEL, 1990) invented by Alex R. Kaye, U.S. Pat. No. 6,006,691 (title: KNOCK-DOWN BOAT ASSEMBLY, 1999) invented by Stephen E. Wilce, U.S. Pat. No. 6,615, 762 (title: FOLDABLE BOAT WITH LIGHT WEIGHT HULL CONSTRUCTION SYSTEM, 2003) invented by Stephen E. Wilce, and U.S. Pat. No. 8,316,788 (title: COLLAPSIBLE KAYAK, 2012) invented by Anton Michael Willis.

Among the techniques pertaining to the third category, there is a need for US patent techniques of the last two cases to be described in more detail with regard to the foldable canoe according to the present invention.

First, the technique proposed in the technique of U.S. Pat. No. 6,615,762 has several significant technical characteristics different form the other conventional techniques in the foldable boat field. It is that the body of the boat is made of a thin corrugated sheet with a thickness ranging from 5 mm to 6 mm, i.e., marketed as brand name HI-CORE®COROPLAST™, COREX, PLASTICCORE®, BIPLEX, etc., formed by extruding ultralight thin hard material, that is, high-strength polyethylene, high-density plastic or the like without a reduction in formability, foldability, and strength. In detail, as shown in FIG. 27d, a resin corrugated sheet CS used in this technique is a corrugated sheet that includes: a pair of panels 56 which are arranged parallel to each other with a predetermined distance therebetween to form front and rear surfaces; and a plurality of spacers 57 that perpendicularly connect the panels 56 to each other. Such a synthetic resin corrugated sheet was already known in other industrial fields, for example, as being widely used as the material of a box for packing objects, e.g., a moving box. Although U.S. Pat. No. 6,615,762 does not includes the ultralight corrugated sheet itself used as the material of a boat in claims, it proposed use of the corrugated sheet as the material of a disassemblable boat based on the facts that the corrugated sheet is neither affected by water, nor corrodes or rusts, and is excellent in impact resistance, penetration resistance, and weatherproofness providing resistance to severe external environment conditions, etc.

As shown in FIGS. 27a through 27d, in this technique, the boat body includes a plurality of individual corrugated sheets CS1 that are designed in predetermined shapes, and each of which has several folding lines 50. When the boat is assembled, the corrugated sheets CS1 are appropriately folded along the folding lines 50 and are arranged. The corrugated sheets are thereafter coupled to each other by screws with annular ribs R interposed between the lateral opposite ends of the corrugated sheets, thus forming the body of the kayak boat as shown in FIG. 27a. Unlike the existing techniques, in the technique of U.S. Pat. No. 6,615,762, each folding line on which the corrugated sheet is folded functions as a living hinge such that even after the sheet is repeatedly folded and unfolded around the folding line, it is prevented from being broken off. Therefore, this technique does not require a separate hinge. Furthermore, physical processes for forming the corrugated sheet, i.e., cutting a predetermined unit panel, boring holes such as screw coupling holes having various sizes in the panel, and pressing the panel to form a folding line, can be conducted at the same time, for example, by a single pressing process. Consequently, this technique is evaluated as being able to markedly enhance the productivity.

With regard to use of a high-strength ultralight synthetic resin corrugated sheet as the material for foldable boats, the technique of U.S. Pat. No. 6,615,762 is known as being the first in the world. Furthermore, this technique provides secondary effects of facilitating printing on the outer surface of a hull of the boat.

Meanwhile, in the same manner as the technique of U.S. Pat. No. 6,615,762, the technique of U.S. Pat. No. 8,316,788 uses a synthetic resin corrugated sheet as the material for boat bodies and thus has the same technical effects resulting from use of the synthetic resin corrugated sheet. However, unlike the technique of U.S. Pat. No. 6,615,762 in which the boat body is formed by joining the several separated corrugated sheets with each other, a single synthetic resin corrugated sheet is used, and folding lines are formed on the sheet designed such that the sheet can be formed in a boat shape by folding the sheet along the folding lines. That is, the single synthetic resin corrugated sheet has only to be folded or unfolded in a similar manner to that of paper folding to form a boat or make it become a package form for storage.

Formed in the synthetic resin corrugated sheet, the folding lines of the technique of U.S. Pat. No. 8,316,788 also function as living hinges, which are not broken even after they are repeatedly bent along the folding lines. Because the single corrugated sheet is used to form a boat body, this technique has not only the effects of the technique of U.S. Pat. No. 6,615,762 but also effects of a reduction in the number of elements and facilitation of assembly and disassembly processes.

However, the crucial point to note is that both the techniques of U.S. Pat. No. 6,615,762 and U.S. Pat. No. 8,316,788 pertain to kayaks rather than canoes. Although kayaks and canoes are similar in that both are personal non-powered small boats, it should be noted that there is a great difference in mechanical structure therebetween.

In more detail, kayaks are configured such that a side bottom panel that is immersed in water and brought into contact with water is integrally connected to an upper deck that substantially horizontally covers the upper ends of left and right side panels and does not come into contact with water. A tubular closed space defined by the side bottom panel and the upper deck becomes a cockpit in which a user sits. Generally, a coaming or the like is provided for preventing water from entering the cockpit through an opening of the cockpit, which is formed in an approximately central portion of the upper deck.

Unlike such kayaks, canoes typically have an open top boat structure, and have a non-tubular shape, including only a side bottom panel without a separate upper deck.

To make a boat manufactured by shaping a thin planar sheet using a given amount of material (to form a predetermined cross-sectional area and surface area) have a mechanically stable structure strong enough to resist to external force, the boat must be shaped such that the section performance thereof (particularly, geometrical moment of inertia) are increased. With regard to manufacture of a boat using a thin synthetic resin corrugated sheet, in the case of kayaks having a closed tubular body structure, the geometrical moment of inertia is comparatively large so that the resistance to external force can be easily increased. However, in the case of canoes generally having an open top structure, the geometrical moment of inertia thereof is smaller than that of the kayaks. Thus, it is not easy to manufacture an open top canoe by means of folding a thin sheet. As the result of tests, for example, if an open top canoe having a length ranging from 3 m to 4 m and a central width of about 1 m is formed by folding a thin synthetic resin corrugated sheet, the shape of a boat is not satisfactorily formed or it is difficult to retain the shape of a side panel moving limply because the section performance as a canoe boat is very low although the physical (mechanical) properties, such as strength, durability, etc., of the synthetic resin corrugated sheet are excellent.

Due to these reasons, both the inventor of U.S. Pat. No. 6,615,762 and the inventor of U.S. Pat. No. 8,316,788 would have thought that kayaks having a longitudinal tubular body structure are easier to manufacture using a light and thin synthetic resin corrugated sheet having a high strength. This aspect can be easily verified in that: in U.S. Pat. No. 6,615,762, a tubular structure is formed by enclosing the circumferences of the annular ribs with panels forming the boat body; in U.S. Pat. No. 8,316,788, claim 1 includes, as an essential configuration, forming a tubular shape by folding left and right panels along a longitudinal axis and joining opposite edges of left and right panels to each other; and another independent claim 22 includes, as an essential configurations integrally forming the keel of the kayak (keel: a long and large member provided parallel to a center axis on the bottom of a boat so as to support the hull of the boat), the hull (the side bottom panel), and the deck (the upper cover panel).

Therefore, there is a need for a technique that can construct a body of a boat by folding a single high-strength thin synthetic resin sheet in a similar manner to that of paper folding, and that can construct an open top (deckless) boat, i.e., a canoe, having a mechanically stable structure without the side bottom panel moving limply. The present invention is provided to satisfy this need.

DISCLOSURE

Technical Problem

Accordingly, the present invention has been made keeping in mind the above problems occurring in the prior art, and an object of the present invention is to provide a foldable canoe that is configured such that a body of a deckless open top canoe can be formed by folding a single synthetic resin sheet, left and right parts of a side bottom panel of the canoe can retain their shape with respect to the lateral direction of the canoe without moving limply, and a smooth gunwale line can be reliably maintained.

Another object of the present invention is to provide a foldable canoe in which bow and stem parts thereof are formed to be sharp (such that the bow and stem parts are tapered outward with respect to the longitudinal direction of the canoe) so that in the same manner as a conventional usual canoe produced by the typical manufacturing method, a beautiful bow or stem line of the canoe can be maintained, and resistance between the canoe and water can be hydrodynamically reduced as much as possible to enhance the moving performance (with regard to straightness, a driving speed, etc.) of the canoe, and that has a means for enhancing the waterproofing performance of the bow and stem parts of the canoe that are mostly prone to water penetration and each of which is divided into two parts to be operatively joined or separated with or from each other when the single corrugated sheet is folded to form the canoe.

A further object of the present invention is to provide a foldable canoe that includes a floor board laterally placed on the bottom of the canoe so as to mechanically reinforce the bottom of the canoe that is not only a portion of the canoe body to which the largest uplift water pressure from the outside is applied when the canoe is used but also is a portion of the canoe body to which the weight of a user who sits in the canoe is applied, wherein the floor board assists retaining the mechanical shape of the canoe body, reinforces mechanical stress (i.e., compressive stress or shear stress) of the bottom of the canoe, and can also be used as a packing member that can wrap the folded canoe body to form a compact shape when the canoe is stored after use.

The above and other objects, features and advantages of the present invention will be more clearly understood from the following detailed description taken in conjunction with the accompanying drawings.

Technical Solution

In order to accomplish the above objects, in an aspect, the present invention provides a foldable canoe formed by folding a single synthetic resin sheet, the foldable canoe including: a folding line formed in a surface of the synthetic resin sheet, the folding line functioning as a living hinge enabling the synthetic resin sheet to be folded or unfolded to form a predetermined first, second, or third shape, wherein the first shape is a shape in which at least portion of the synthetic resin is unfolded in a planar shape, the second shape is an open-top canoe shape in which a side bottom panel, a bow part, and a stem part are formed without a deck horizontally covering left and right upper ends of the side bottom panel, and the third shape is a shape in which when a plurality of panel parts partitioned by the folding line are folded forward or rearward to be close to each other along the folding line according to a predetermined sequence, the synthetic resin sheet is folded in a hexahedral box shape; and a U-shaped removable rib installed to be brought into contact with an inner surface of the synthetic resin sheet in a lateral direction of the canoe when the synthetic resin sheet is formed in the second shape.

In another aspect of the present invention, the bilateral symmetrical curved cut parts that are operatively closed by the zipper may include: a waterproof rubber band designed in a shape corresponding to shapes of the curved cut parts and adhered along perimeters of the curved cut parts of left and right sheet parts; a waterproof cloth sheet having a predetermined area and adhering to an upper surface of the waterproof rubber band; the zipper attached to the waterproof cloth sheet along the shapes of the curved cut parts of the left and right sheet parts; a clamp or stapler pin fixed into the zipper, thus integrally coupling the left and right sheet parts, the waterproof rubber band, the waterproof cloth sheet, and the zipper to each other.

In a further aspect of the present invention, the foldable canoe may further include at least one floor board placed on a bottom of the side bottom panel of the canoe such that the floor board crosses over at least an overall width of the canoe. The floor board is pushed on an upper surface thereof by at least one U-shaped rib, whereby the floor board is reliably fixed on the bottom of the side bottom panel of the canoe, thus improving the mechanical performance of the bottom of the canoe.

In yet another aspect of the present invention, the floor board may include two floor boards. When the synthetic resin sheet is folded in the third shape that is the hexahedral box shape, each of the floor boards has shape and size such that the floor board can function as a two-division external package wrapping one of upper and lower parts of an outer surface of the hexahedral box shaped synthetic resin sheet.

In still another aspect of the present invention, the two floor boards may include a buckle for fastening the two floor boards to each other to form a box shape when the two floor boards are used as the two-division external packages wrapping the outer surface of the synthetic resin sheet folded in the third shape.

In still another aspect of the present invention, the foldable canoe may further include stiff gunwale caps, each of which has a predetermined length, and which are successively coupled to a gunwale, formed on the upper ends of the side bottom panel, along a longitudinal direction of the gunwale.

In still another aspect of the present invention, a triangular notch or depression may be formed in an upper end of each of left and right side panel parts of the synthetic resin sheet that form the side bottom panel. A buckle may be provided crossing over the notch or depression, the buckle adjusting an axial length of a gunwale line of the canoe. When the buckle is tightened, the notch or depression is closed, whereby the gunwale line is reduced in the axial length and is formed in a smooth streamlined shape.

Advantageous Effects

In a foldable canoe according to the present invention, a body of the canoe having an open top structure can be formed by folding a single high-strength thin synthetic resin sheet having a predetermined flexibility. Left and right parts of a side bottom panel of the canoe can be retained in shape without moving limply by using only auxiliary elements (a rib, a floor board, a gunwale cap) that have simple structures and are convenient to use. Bow and stem parts that are operatively joined or separated with or from each other when the single corrugated sheet is folded to form the canoe can be configured such that the appearance, watertightness, and movement performance of the canoe can be enhanced.

Furthermore, the mechanical shape of the canoe body can be reliably maintained by the rib and the floor board used to reinforce the bottom of the canoe. Particularly, the floor board can be used as a packing member that can wrap the folded canoe body to make it compact and neat when the canoe is stored after used. Thereby, the weight of the product can be reduced, and the applicability of the elements can be enhanced.

DESCRIPTION OF DRAWINGS

FIG. 1 is a development view (top plan view) of a canoe according to the present invention;

FIG. 2 is a development view (bottom plan view) of the canoe according to the present invention;

FIG. 3 is a side view illustrating the assembled canoe according to the present invention;

FIG. 4 is a plan view illustrating the assembled canoe according to the present invention;

FIG. 5 is a view showing both elements for retaining the shape of the canoe after the canoe has been assembled and elements for packing the folded canoe;

FIG. 6 is a perspective view illustrating the assembled canoe according to the present invention;

FIG. 7 is a perspective view illustrating an initial assembly process for forming the canoe from a development state that is substantially planar;

FIG. 8 is a perspective view illustrating a stem part zipped up;

FIG. 9 is a perspective view showing a process of placing upright a lateral support fitted over heads of bolts;

FIG. 10 is a partially-enlarged perspective view showing a configuration for coupling a rib to a gunwale of the canoe;

FIG. 11 is a perspective view illustrating a process of rotating ribs such that the ribs are placed upright on a floor board and thus reliably fastening the floor board to the bottom of the canoe;

FIG. 12 is a perspective view showing installation configuration of elements for retaining the shape of the canoe when the canoe is assembled according to the present invention;

FIG. 13 illustrates a partial enlarged view showing a cap fitted over an upper end of a gunwale and a partial enlarged view showing configuration for installing a pair of small removable deck parts in each of the bow and stem parts of the canoe according to the present invention;

FIG. 14 is a development view showing the inner surface of a single panel used for forming the canoe to illustrate a process of packing the canoe;

FIGS. 15 through 25 are perspective views showing a process of successively folding the single sheet to make the canoe be a package for storage;

FIG. 26 is an exploded perspective view showing a waterproofing configuration provided on the stem (or bow) part of the foldable canoe according to the present invention;

FIG. 27 is a representative view of U.S. Pat. No. 6,615,762 that proposes a kayak configured such that a plurality of synthetic resin corrugated sheets each designed in a predetermined shape are longitudinally and successively connected to each other with ribs interposed therebetween so that a floor board, both side panels and an upper deck are integrally formed;

FIG. 28 illustrates another embodiment of the foldable canoe according to the present invention in which bow and stem parts of the canoe are previously integrally assembled; and FIGS. 29 through 36 are views showing a process of folding the foldable canoe of FIG. 28 to make it be a package for storage.

BEST MODE

FIG. 1 is a development view (top plan view) of a canoe according to the present invention. FIG. 2 is a development view (bottom plan view) of the canoe according to the present invention. FIG. 3 is a side view illustrating the assembled canoe according to the present invention. FIG. 4 is a plan view illustrating the assembled canoe according to the present invention.

As shown in FIGS. 1 through 4, a foldable canoe according to the present invention is made of a planar synthetic resin rigid sheet having a predetermined flexibility without use of a separate structural frame. The canoe is configured such that the sheet can be folded along folding lines formed in an inner surface of the sheet so as to form the canoe. After use of the canoe, the sheet can be completely folded along the folding lines to form a compact structure, thus reducing the volume and length of the canoe, thereby facilitating transportation and storage of the canoe.

For instance, the synthetic resin sheet used in the present invention may be a thin corrugated sheet, with a thickness ranging from 5 mm to 6 mm, i.e., marketed as brand name HI-CORE®COROPLAST™, COREX, PLASTICCORE®, BIPLEX, etc., formed by extruding high-strength polyethylene, high-density plastic or the like, in the same manner as that of a corrugated sheet introduced in U.S. Pat. No. 6,615,762. The canoe according to the present invention made of such synthetic resin corrugated sheet is mere 18 kg to 22 kg in weight when the length thereof ranges from 4 m to 5 m and the width thereof ranges from 1 m to 1.5 m.

Meanwhile, any synthetic resin sheet, as well as the above-mentioned corrugated sheet, can be used in the present invention so long as a hinge line functioning as a living hinge, which is not broken even if it is repeatedly bent, can be formed in the surface of the sheet. Alternatively, the foldable sheet for the canoe may include a plurality of pieces that are joined with each other by waterproof tape.

In FIG. 1, a solid line is a cutting line, and a dotted line is a folding line. As can be understood from FIGS. 1 and 2, the deployed synthetic resin corrugated sheet substantially has a symmetrical shape with respect to both a front-rear (longitudinal) direction and a left-right (lateral) direction. This front, rear, left and right symmetrical shape is proposed merely as an exemplary embodiment of the present invention, and the present invention is not limited to this. As needed, the canoe may be configured such that it has a symmetrical shape in a left-right (lateral) direction while having an asymmetrical shape in a front-rear (longitudinal) direction, for example, differing in shape between the bow and the stem. This modification must be regarded as falling within the bounds of the present invention so long as such a difference in shape between the bow and the stem complies with the spirit of the present invention that is based on the specification of the present invention.

In FIG. 1, reference numerals ① to ⑦ denote panel parts that are partitioned by the folding lines. Reference numerals 11 to 17 are numerals for indicating the respective folding lines. Reference numerals 21 to 39 (with branching numerals) are elements that are attached to the canoe boat when the canoe boat is manufactured with the corrugated sheet. In detail, numeral 21 denotes a protruding bolt head or head pin (refer to FIG. 10 showing an enlargement thereof) that is fixed on the surface of the corrugated sheet so as to mount a rib to the corrugated sheet. Reference numeral 22 denotes removable small deck parts that are respectively attached to front and rear parts (bow and stem) of the canoe. Reference numeral 28 denotes buckles that are installed on respective opposite sides of the canoe panel to facilitate a last closing operation of a process of folding the canoe panel to form a packed state (refer to FIG. 25). Reference numeral 29 denotes gunwales that respectively form left and right edges of the boat.

In FIG. 2, reference numeral 23 denotes waterproof cloth sheets that are provided for watertightness of the stem and bow parts of the canoe, and each of which covers both left and right cut-shaped symmetrical parts of the stem or bow part. When a zipper is closed, each waterproof cloth sheet is contracted inside the zipper and housed in the stem or bow part of the boat.

Reference numeral 24 denotes a zipper that closes curved edges of cut panels of the stem or bow part such that the curved edges engage with each other. In the present invention, the zipper may be replaced with Velcro tape, a buckle, a snap button or the like.

Reference numeral 25 denotes an outermost elastic rubber cover that covers the zipper of the stem or bow part so as to prevent the zipper from being exposed to the outside, strengthens the coupling force of the zipper and thus prevents the zipper from undesirably opening, and protects the corresponding stem or bow part from shock when the curved part of the stem or bow part having a tapered shape collides with an external object. In addition, the rubber cover 25 functions to enhance waterproof performance. As shown in the drawing, a first end of the rubber cover 25 is fixed to a lower surface of an outer central portion of the stem (or bow) part of the panel, and a second end thereof is a free end. After the stem (or bow) part of the canoe has been completely assembled to form a tapered edge shape, the second end (the free end) of the rubber cover 25 is elastically extended upward such that the rubber cover 25 covers the tapered curved edge of the stem (or bow) part, and then is operatively hooked to a protruding ring (not shown) or the like of the stem (or bow) part so that the rubber cover 25 can be elastically maintained tight. Furthermore, the rubber cover 25 may be appropriately selected in a color to be an aesthetic point of the appearance of the canoe.

Hereinafter, the configuration of the stem or bow part for operatively and watertightly opening or closing the curved edges of the left and right cut panels using the waterproof cloth sheet 23 and the zipper 24 will be described in more detail with reference to FIG. 26.

FIG. 26 is an exploded perspective view showing a waterproofing configuration provided on the stem (or bow) part of the foldable canoe according to the present invention. A waterproof rubber band 60 that is cut to have a shape corresponding to the curved edges of the left and right cut panels is attached along the curved edges of the left and right cut panels by adhesive (not shown). The perimeter of the waterproof cloth sheet 23 having a predetermined area is attached to an upper surface of the waterproof rubber band 60 by adhesive (not shown). The zipper 24 is attached to the perimeter of the waterproof cloth sheet 23 by adhesive (not shown) along the curved edges of the left and right cut panels. To integrally join the left and right panel parts ⑦, the waterproof rubber band 60, the waterproof cloth sheet 23, and the zipper 24 with each other, a plurality of clamps or stapler pins 61 are driven into the zipper 24 along the adhered portions of the above elements. The clamps or stapler pins 61 can further enhance the coupling force of the elements to the left and right panel parts of the bow part and the waterproof performance of the waterproofing configuration. Reference numeral 62 denotes a finish cover that covers the clamps or stapler pins 61 driven into the zipper 24 and emphasize the curved shape of the bow part. The finish cover is attached to the upper surface of the zipper by adhesive (not shown).

One of the objects of the present invention provides a means for: making the bow and stem parts of the canoe as sharp as possible (such that the canoe is tapered the front and rear parts thereof) so that in the same manner as a conventional usual canoe produced by the typical manufacturing method, a beautiful bow or stem line of the canoe can be maintained, and resistance between the canoe and water can be hydrodynamically reduced as much as possible to enhance the moving performance (with regard to straightness, a driving speed, etc.) of the canoe; and enhancing the waterproofing performance of the bow and stem parts of the canoe that are most prone to water penetration and each of which is divided into two parts to be joined with each other when the single corrugated sheet is folded to form the canoe. This object of the present invention can be effectively achieved by the configuration of the curved edges of the cut panels, the operative opening and closing configuration of the zipper, and the configuration in which multi-layers of essential elements 23, 24, and 28 are firmly and integrally coupled to the edges of the curved parts of the cut panels.

Referring again to FIG. 2, reference numeral 26 denotes buckles for coupling a pair of divided decks 22, which are respectively provided on left and right sides of the canoe panel, to each other when the canoe is assembled.

The present invention is to provide a three-dimensional canoe that can be formed by folding a single planar panel. Particularly, to appropriately form a continuous curved gunwale line that forms a smooth streamlined shape when the canoe is assembled, approximately triangular notches or depressions are formed in each side panel part. Reference numeral 27 denotes a buckle provided around each notch or depression for use in adjusting the longitudinal length of an upper gunwale line of a side surface of the canoe. The triangular notch or depression is closed by tightening the buckle 27 so that the gunwale line can be reduced in length while forming a smooth streamlined shape. A zipper, Velcro tape, etc. may be substituted for the buckle 27.

FIG. 5 is a view showing both elements for retaining the shape of the canoe after the canoe has been assembled and elements for packing the folded canoe. Reference numeral 41 denotes a U-shaped first rib RIB#1 (a single rib, coupled to a bolt head 21-1 of FIG. 1). Reference numeral 42 denotes U-shaped second ribs RIB#2 (two ribs, each coupled to a bolt head 21-2 of FIG. 1). Reference numeral 43 denotes U-shaped third ribs RIB#3 (two ribs, each coupled to a bolt head 21-3 of FIG. 1). Installation of these ribs in the canoe is clearly illustrated in FIGS. 6, 9, 10, and 11.

In the present invention, the ribs are removably fixed on inner surfaces of left and right panels of the canoe. Such ribs conduct a pivotal role in retaining the streamlined shape (in which the degree with which the canoe is bulged is gently varied in the longitudinal direction of the canoe) of the canoe boat with respect to the lateral direction. Preferably, the size and shape of each U-shaped rib corresponds to the lateral size and shape of a corresponding portion of the canoe. However, the shapes, the installation positions, and the number of ribs may be changed depending on a design of the canoe without being limited to those of the above-mentioned exemplary embodiment.

Reference numeral 44 denotes a gunwale cap that is coupled to an upper end of the gunwale along the gunwale line. In the present invention, the gunwale cap conducts an important role along with the above-mentioned ribs in an aspect of retaining the smooth streamlined shape of the canoe for producing, by a means of bending a single sheet, an open top canoe, the geometrical moment of inertia of which is comparatively small, rather than producing a tubular kayak.

In detail, the gunwale cap 44 is a longitudinal member having comparatively high stiffness with a U-shaped cross-section. In this embodiment, a plurality of gunwale caps 44 is successively fitted over the gunwale along the gunwale line and also fitted over front edges of the above-mentioned left and right deck parts, thus reinforcing the gunwale, and making the gunwale line smoother (refer to FIGS. 12 and 13). Preferably, the lengths of the gunwale caps 44 are set in advance such that when the gunwale caps 44 are successively fitted over the gunwale 29 in the longitudinal direction, a portion at which the triangular notch or depression is tightened by the buckle 27 (this portion is a mechanically weak portion that is not integrated into a single body) is disposed in a medial portion of the corresponding gunwale cap.

Reference numeral 45 denotes an H-cap. Referring to FIGS. 12 and 13, the H-cap 45 couples contact edges of two deck parts that are coupled to the inner surface of each of the bow and stem parts of the canoe boat when it is assembled, thus preventing the deck from being distorted. A contact edge of each deck part 22 is fitted between upper and lower flanges of the H-cap to a left or right surface of a web of the H-cap. The gunwale cap is fitted over the lateral front edges of the deck parts 22 (refer to FIG. 12). The deck parts 22 introduced in the present invention completely differ from the deck used to produce the kayak proposed in U.S. Pat. No. 8,316,788. The deck proposed in U.S. Pat. No. 8,316,788 is a body member (an element conducting a role for forming a tubular shape) that is formed by bending a panel, has a comparatively large area, and is integrated with other portions of the panel. However, the decks 22 introduced in the present invention are manufactured as separate elements, rather than being elements formed by integrally bending a portion of the corrugated sheet, and then are separately coupled to the corrugated sheet during the assembly process of the canoe. The decks 22 must be understood as subsidiary elements provided for preventing the left and right parts of the bow or stem part, which are coupled to each other by a zipper or the like, from being distorted or opened to the left and right sides.

Reference numeral 46 denotes a floor board. In the present invention, two floor boards made of the same material as that of the corrugated sheet forming the canoe body are preferably provided. Furthermore, it is preferable that each floor board have folding lines for providing an appropriate curvature such that it comes into close contact with the bottom and portions of the side panels of the canoe. In the present invention, the floor boards are provided to mechanically reinforce the bottom of the canoe that is not only a portion of the canoe body to which the largest uplift water pressure from the outside is applied when the canoe is used but also is a portion of the canoe body to which the weight of a user who sits in the canoe is applied. Crossed over the bottom of the canoe in the lateral direction of the canoe, the floor boards 46 assist retaining the mechanical shape of the canoe body. In addition, the floor boards 46 function to increase the thickness of the bottom of the canoe that forms a loading space of the canoe, thus reinforcing mechanical stress (i.e., compressive stress or shear stress) of the bottom of the canoe. As shown in FIGS. 23 through 25, the floor boards 46 can also be used as packing members that can wrap the folded canoe body to form a compact shape when the canoe is stored after used. In terms of this, the floor boards 22 conduct an important role for achieving one of the objects of the present invention despite each having a simple shape, being made of the same material as that of the canoe body, and being needed in only a small number. After the floor board 46 is spread to be brought into close contact with the bottom of the canoe, the first rib 41 and the third ribs 43 are fitted into the canoe body at positions corresponding to the longitudinal opposite ends of the floor boards, and the second ribs 42 are installed such that they press the upper surfaces of the floor boards (refer to FIGS. 6 and 9). However, the positional relationship between the floor boards 46 and the ribs 41 through 43 is not directly related to the characteristics of the present invention and must be understood as being variable.

Reference numeral 47 denotes a seat on which the user sits. As shown in FIG. 6, the seat 47 is placed on the second and third ribs 42 and 43 and fixed thereto by a buckle (not shown).

Reference numeral 48 denotes a belt. When the floor board 46 wraps the canoe body in a package fashion to store the canoe, the belt 48 is connected to rings provided on the floor board 46 and thus can be used as a shoulder strap (refer to FIGS. 24 and 25).

Reference numeral 49 denotes a bag for storage of elements. That is, the bag 49 is used to store the ribs 41 through 43 and the gunwale caps 44.

FIG. 6 is a perspective view illustrating an exemplary embodiment of the assembled state of the canoe according to the present invention having the above-mentioned configuration. FIGS. 7 through 13 are views illustrating a process of constructing the canoe shown in FIG. 6. Hereinafter, the assembly process or assembly configuration of the foldable canoe according to the present invention will be described in more detail with reference to FIGS. 7 through 13.

FIG. 7 illustrates an initial stage of the assembly process. The sheet panel is longitudinally folded based on the central folding lines 11, 14, and 16. The waterproof cloth sheets 23 are thereafter folded and inserted into the canoe panel such that when the zipper is closed, the waterproof cloth sheets 23 are prevented from being caught by teeth of the zipper. FIG. 8 illustrates a zipped-up state of the stem part. The waterproof cloth sheet is pushed into and housed in the canoe panel. FIG. 9 illustrates a process of inserting the bolt heads 21-3 into the third ribs 43 and rotating the third ribs 43 around the bolt heads 21-3 to make the third ribs 43 be oriented upright. FIG. 9 also illustrates a process of closely placing the two floor boards 46 between the third ribs 43. With regard to the structure of fastening the rib 43 to the bolt heads 21-3, for example, as shown in the enlarged view of FIG. 10, keyhole-shaped slots are formed in the rib 43, and each bolt head 21-3 is inserted into a large hole part of the corresponding slot and pushed along the slot such that the bolt head 21-3 is prevented from being removed from the slot. Subsequently, the rib is rotated around the bolt heads such that the rib is oriented to be perpendicular to the bottom of the canoe with the two floor boards placed between the two ribs. FIG. 11 illustrates a process of inserting the bolt heads 21-1 into the first rib 41 and rotating the first rib 41 around the bolt heads 21-1 to make the first rib 41 perpendicular to the bottom of the canoe, and then inserting the bolt heads 21-2 into the second ribs 42 and rotating the second ribs 42 around the bolt heads 21-2 such that the second ribs 42 are placed upright on the floor board 46 to push the floor boards 46 downward and thus reliably fix the floor boards 46 on the bottom of the canoe. FIG. 12 illustrates a process of successively pulling the eight buckles 27 provided on the side panels of the canoe boat such that the overall shape of the canoe becomes a smooth streamlined shape. FIG. 12 also illustrates processes of: fitting the gunwale caps over the gunwale to reinforce the gunwale and retain the smooth shape of the gunwale line; longitudinally fitting each H-cap 45 between a corresponding pair of deck parts, tightening the buckles 26, and then fitting the gunwale caps over the front edges of the deck parts so that the deck parts are fixed to be level with each other; placing each seat 47 on the corresponding second and third ribs and tightening a buckle (not shown) provided under the seat 47 to fix the seat 47 to the second and third ribs; and pulling the rubber cover 25 provided on the outer surface of the stem part and elastically covering the entirety of the stem part with the rubber cover 25. FIG. 13 shows enlarged views illustrating the gunwale cap fitted over the upper edge of the gunwale and the H-cap used to couple a pair of deck parts to each other. As illustrated in FIG. 12, the gunwale cap is also used for linearly connecting the edges of the deck parts to each other.

Next, a process of packing the foldable canoe according to the present invention to make it compact and facilitate transportation and storage of the canoe after used will be described with reference to FIGS. 14 through 25.

FIG. 14 is a development view showing the inner surface of a single panel used for forming the canoe to illustrate the packing process. As shown in FIGS. 14 and 15, the panel of the canoe is folded inward based on the folding lines 15 and then folded outward based on the folding lines 17. As shown in FIG. 16, the panel is folded inward based on the folding lines 11 and 14. Subsequently, as shown in FIG. 17, the panel is folded outward based on the folding lines 13 while the panel parts 6 and 7 are pulled inward such that the panel is folded as shown in FIG. 18. Thereafter, as shown in FIG. 19, the panel of the canoe is folded such that the panel parts 1 face and cover each other. As shown in FIG. 20, the buckle 28 provided on ends of the panel panels 1 is fastened such that first of all only a first end of the panel is temporarily closed. As shown in FIG. 21, the panel is folded along the folding lines 13 provided on a second end of the panel, and the panel parts 6 and 7 are pulled inward. Thereafter, as shown in FIG. 22, the buckle 28 provided on the panel parts 1 that is disposed on the second end of the panel is fastened. Both the buckles are tightened as needed so that the shape of the package becomes compact and neat. Subsequently, as shown in FIG. 23, one of the floor boards 46 that is provided without the rings covers a lower part of the folded canoe package, and the other floor board 46 with the rings covers an upper part of the canoe package. FIG. 24 illustrates process of finally packing the canoe panel using the buckles attached on the floor boards 46 and connecting the belt 48 to the rings to allow the user to easily carry the canoe package on his or her shoulder. FIG. 25 illustrates the completed canoe package. Meanwhile, the other elements 41 through 49 such as ribs are stored in the separate portable bag 49.

In the above-mentioned embodiment, each of the bow and stem parts has been illustrated as having the curved cut parts forming a bilateral symmetrical structure when the sheet is deployed and as being operatively contracted by the waterproof rubber band, the waterproof cloth sheet and the zipper to provide a boat shape, which is tapered in the bow and stem parts, when the sheet is assembled to construct the canoe. However, in another embodiment, as shown in FIG. 28, each of the bow and stem parts has a single part structure with a tapered shape and maintains the original shape even when the sheet is deployed and assembled to form a canoe or folded into a package shape for storage. FIGS. 29 through 36 are views showing a folding pattern in a process of successively folding the foldable canoe of FIG. 28 to form a canoe package.

The general configuration of the embodiment of FIGS. 28 through 36, other than the fact that each of the bow and stem parts is integrally watertightly formed, is the same as that of the earlier embodiment. This embodiment is advantageous in that because each of the bow and stem parts maintains the watertightly integrated structure regardless of the folded state of the sheet, water can be more reliably prevented from entering the canoe through the bow or stem part. Furthermore, in this embodiment, the process of folding the sheet into the package shape or unfolding the sheet that has been in the package shape and forming a canoe can be more easily conducted.

The invention claimed is:

1. A foldable canoe formed by folding a single synthetic resin sheet, the foldable canoe comprising:
   a folding line formed in a surface of the synthetic resin sheet, the folding line functioning as a living hinge enabling the synthetic resin sheet to be folded or unfolded to form a predetermined first, second, or third shape, wherein the first shape is a shape in which at least portion of the synthetic resin is unfolded in a planar shape, the second shape is an open-top canoe shape in which a side bottom panel, a bow part, and a stern part are formed without a deck horizontally covering left and right upper ends of the side bottom panel, and the third shape is a shape in which when a plurality of panel parts partitioned by the folding line are folded forward or rearward along the folding line according to a predetermined sequence, the synthetic resin sheet is folded in a hexahedral box shape; and
   a U-shaped removable rib installed to be brought into contact with an inner surface of the synthetic resin sheet in a lateral direction of the canoe when the synthetic resin sheet is formed in the second shape, wherein a triangular notch or depression is formed in an upper end of each of left and right side panel parts of the synthetic resin sheet that form the side bottom panel, and a buckle (27) is provided crossing over the notch or depression, the buckle (27) adjusting an axial length of a gunwale line of the canoe, wherein when the buckle (27) is tightened, the notch or depression is closed, whereby the gunwale line is reduced in the axial length and is formed in a smooth streamlined shape.

2. The foldable canoe of claim 1, further comprising:

a gunwale cap (44) coupled to a gunwale (29), formed on the upper ends of the side bottom panel, along a longitudinal direction of the gunwale.

3. The foldable canoe of claim 1, wherein in the first shape of the synthetic resin sheet, a portion thereof corresponding to each of the bow and stem parts of the second shape comprises bilateral symmetrical curved cut parts, wherein when the shape of the synthetic resin sheet is changed from the first shape to the second shape, the curved cut parts are operatively closed by a zipper so that each of the bow and stem parts has a linear shape that is tapered outward in a longitudinal direction of the canoe.

4. The foldable canoe of claim 1, wherein in the first shape, a portion of the synthetic resin sheet other than the bow and stern parts is deployed in a planar shape.

5. The foldable canoe of claim 3, wherein the bilateral symmetrical curved cut parts that are operatively closed by the zipper comprise:

a waterproof rubber band (60) designed in a shape corresponding to shapes of the curved cut parts and adhered along perimeters of the curved cut parts of left and right sheet parts;

a waterproof cloth sheet (23) having a predetermined area and adhering to an upper surface of the waterproof rubber band (60);

the zipper (24) attached to the waterproof cloth sheet (23) along the shapes of the curved cut parts of the left and right sheet parts;

a clamp or stapler pin (61) fixed into the zipper (24), thus integrally coupling the left and right sheet parts, the waterproof rubber band (60), the waterproof cloth sheet (23), and the zipper (24) to each other.

6. The foldable canoe of claim 1, further comprising:

at least one floor board (46) placed on a bottom of the side bottom panel of the canoe such that the floor board (46) crosses over at least an overall width of the canoe.

7. The foldable canoe of claim 6, wherein the floor board (46) comprises two floor boards, wherein when the synthetic resin sheet is folded in the third shape that is the hexahedral box shape, each of the floor boards has shape and size such that the floor board can function as a two-division external package wrapping one of upper and lower parts of an outer surface of the hexahedral box shaped synthetic resin sheet.

8. The foldable canoe of claim 7, wherein the two floor boards (46) comprise a buckle for fastening the two floor boards (46) to each other to form a box shape when the two floor boards (46) are used as the two-division external packages wrapping the outer surface of the synthetic resin sheet folded in the third shape.

* * * * *